(12) United States Patent
Lank

(10) Patent No.: US 10,934,041 B2
(45) Date of Patent: Mar. 2, 2021

(54) SYSTEM AND METHOD FOR SEALING A PLASTIC ENCLOSURE

(71) Applicant: BRAINCHILD CONCEPTS, LLC, Ormond Beach, FL (US)

(72) Inventor: Juli Lank, Ormond Beach, FL (US)

(73) Assignee: BCC PRODUCT DEVELOPMENT, L.L.C., Ormond Beach, FL (US)

( * ) Notice: Subject to any disclaimer, the term of this patent is extended or adjusted under 35 U.S.C. 154(b) by 178 days.

(21) Appl. No.: 15/995,295

(22) Filed: Jun. 1, 2018

(65) Prior Publication Data

US 2018/0346169 A1 Dec. 6, 2018

Related U.S. Application Data

(60) Provisional application No. 62/513,614, filed on Jun. 1, 2017.

(51) Int. Cl.
*B65B 51/14* (2006.01)
*B29C 65/20* (2006.01)
(Continued)

(52) U.S. Cl.
CPC .......... *B65B 51/148* (2013.01); *B29C 65/18* (2013.01); *B29C 65/2084* (2013.01);
(Continued)

(58) Field of Classification Search
CPC .......... B29C 65/7451; B29C 66/8614; B29C 66/73921; B29C 66/81435;
(Continued)

(56) References Cited

U.S. PATENT DOCUMENTS 2,441,817 A * 5/1948 Huff .......................... B25B 7/20
156/579
2,579,088 A * 12/1951 Piazze ................. B29C 66/1122
156/579
(Continued)

FOREIGN PATENT DOCUMENTS

| EP | 1334706 A1 | 8/2003 |
|---|---|---|
| JP | H04118220 | 4/1992 |
| JP | 3266033 | 1/2002 |

OTHER PUBLICATIONS

ULine; Tabletop Poly Bag Sealers—Impulse with Cutter; https://www.uline.com/BL_2254/Tabletop-Poly-Bag-Sealer-Impulse-with-Cutter.
(Continued)

*Primary Examiner* — Michelle Lopez
*Assistant Examiner* — Chinyere J Rushing-Tucker
(74) *Attorney, Agent, or Firm* — Wolter Van Dyke Davis, PLLC; Robert L. Wolter

(57) ABSTRACT

A method and apparatus for sealing a plastic enclosure is provided. The apparatus includes a handle including elements pivotally coupled together at a first end. The apparatus also includes a heating element positioned along an inner surface of an element and connected to a power source where a longitudinal axis of the heating element is oriented parallel with a longitudinal axis of the element. Plastic material including first and second plastic layers is positioned at an interface between the second elements. Upon pivoting the first elements from an open position to a closed position the heating element increases a temperature at the interface to melt the plastic material and form a seal between the first and second plastic layers.

18 Claims, 21 Drawing Sheets

(51) Int. Cl.
| | |
|---|---|
| *B29C 65/00* | (2006.01) |
| *B65B 3/02* | (2006.01) |
| *B65B 19/34* | (2006.01) |
| *B29C 65/74* | (2006.01) |
| *B29C 65/22* | (2006.01) |
| *B29C 65/18* | (2006.01) |
| *B65B 51/10* | (2006.01) |
| *B29L 31/00* | (2006.01) |
| *B29C 65/30* | (2006.01) |

(52) U.S. Cl.
CPC ............ *B29C 65/22* (2013.01); *B29C 65/743* (2013.01); *B29C 65/7451* (2013.01); *B29C 66/1122* (2013.01); *B29C 66/43* (2013.01); *B29C 66/431* (2013.01); *B29C 66/4312* (2013.01); *B29C 66/43121* (2013.01); *B29C 66/73921* (2013.01); *B29C 66/8161* (2013.01); *B29C 66/81427* (2013.01); *B29C 66/81435* (2013.01); *B29C 66/81457* (2013.01); *B29C 66/8221* (2013.01); *B29C 66/8227* (2013.01); *B29C 66/834* (2013.01); *B29C 66/83241* (2013.01); *B29C 66/849* (2013.01); *B29C 66/8614* (2013.01); *B29C 66/8618* (2013.01); *B29C 66/9121* (2013.01); *B29C 66/9141* (2013.01); *B29C 66/9161* (2013.01); *B29C 66/91443* (2013.01); *B29C 66/91931* (2013.01); *B29C 66/961* (2013.01); *B29C 66/9672* (2013.01); *B29C 66/9674* (2013.01); *B65B 3/02* (2013.01); *B65B 19/34* (2013.01); *B29C 65/224* (2013.01); *B29C 65/226* (2013.01); *B29C 65/228* (2013.01); *B29C 65/30* (2013.01); *B29C 66/8122* (2013.01); *B29C 66/8167* (2013.01); *B29C 66/919* (2013.01); *B29C 66/949* (2013.01); *B29L 2031/7128* (2013.01); *B29L 2031/7174* (2013.01); *B65B 51/146* (2013.01); *B65B 2051/105* (2013.01)

(58) Field of Classification Search
CPC ............ B29C 66/9674; B29C 66/4312; B29C 66/8618; B29C 66/431; B29C 66/849; B29C 66/9121; B29C 66/81457; B29C 66/1122; B29C 66/8227; B29C 66/9672; B29C 65/18; B29C 65/2084; B29C 66/83241; B29C 66/91443; B29C 66/9141; B29C 66/9161; B29C 65/22; B29C 65/743; B29C 66/8161; B29C 66/834; B29C 66/81427; B29C 66/91931; B29C 66/8221; B29C 66/961; B29C 66/43121; B29C 66/43; B65B 51/148; B65B 3/02; B65B 19/34

USPC .......................................................... 53/496
See application file for complete search history.

(56) References Cited

U.S. PATENT DOCUMENTS

| | | | | |
|---|---|---|---|---|
| 2,698,273 | A | * | 12/1954 | Miner .................. B29C 66/348 |
| | | | | 156/282 |
| 2,759,090 | A | | 8/1956 | Frye |
| 2,844,697 | A | | 7/1958 | William |
| 3,149,015 | A | * | 9/1964 | Lindsay .............. B29C 66/8286 |
| | | | | 156/502 |
| 3,200,028 | A | | 8/1965 | Chisholm |
| 3,322,603 | A | * | 5/1967 | Grasso ................ B29C 66/4312 |
| | | | | 156/579 |
| 3,752,017 | A | * | 8/1973 | Lloyd .................. B23K 3/0307 |
| | | | | 81/9.44 |
| 4,025,383 | A | | 5/1977 | Ferrigno |
| 4,138,308 | A | * | 2/1979 | Guenther ................ B29C 65/18 |
| | | | | 156/433 |
| 4,156,382 | A | | 5/1979 | Baker |
| 5,048,269 | A | | 9/1991 | Deni |
| 5,142,123 | A | | 8/1992 | Chou |
| 6,313,439 | B1 | | 11/2001 | Fischbach et al. |
| 6,335,515 | B1 | | 1/2002 | Chou et al. |
| 6,392,198 | B1 | * | 5/2002 | Yao ...................... B29C 66/8122 |
| | | | | 219/243 |
| D528,137 | S | | 9/2006 | Huang |
| D542,315 | S | | 5/2007 | Chang |
| 7,312,421 | B2 | | 12/2007 | Chou et al. |
| 7,315,010 | B2 | | 1/2008 | Chou et al. |
| 7,700,897 | B2 | | 4/2010 | Chou et al. |
| 7,730,698 | B1 | * | 6/2010 | Montano ................ B29C 66/80 |
| | | | | 53/374.2 |
| 2003/0185703 | A1 | * | 10/2003 | Walsh .................. B29C 66/4312 |
| | | | | 422/26 |
| 2004/0045570 | A1 | * | 3/2004 | Yao .......................... A45D 1/02 |
| | | | | 132/224 |
| 2004/0262281 | A1 | * | 12/2004 | Chou .................. B29C 66/8221 |
| | | | | 219/243 |
| 2009/0026190 | A1 | * | 1/2009 | Chang .................. B29C 65/222 |
| | | | | 219/243 |
| 2010/0032098 | A1 | * | 2/2010 | Lalli .................. B29C 66/91212 |
| | | | | 156/359 |
| 2012/0111449 | A1 | | 5/2012 | Hsu |

OTHER PUBLICATIONS

Amazon; Orblue Bag Heat Sealer—Food Saver and Creates Airtight Containers—Cabinet Accessory; https://www.amazon.com/gp/product/B00SHK7M9M.

Digi-Key Electronics; HAKO; https://www.digikey.com/catalog/en/partgroup/fm2023-05-mini-hot-tweezer-kit/65443.

PCT/US2018/064028 International Search Report and Written Opinion, dated Mar. 20, 2019, 17 pages.

\* cited by examiner

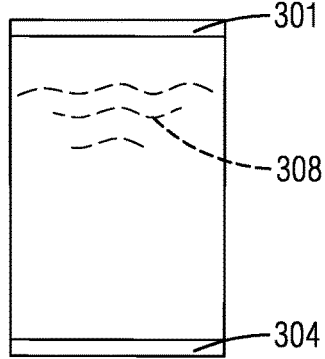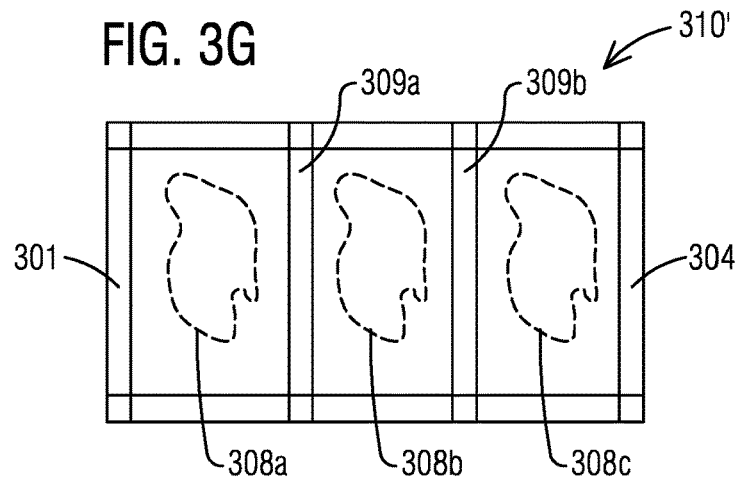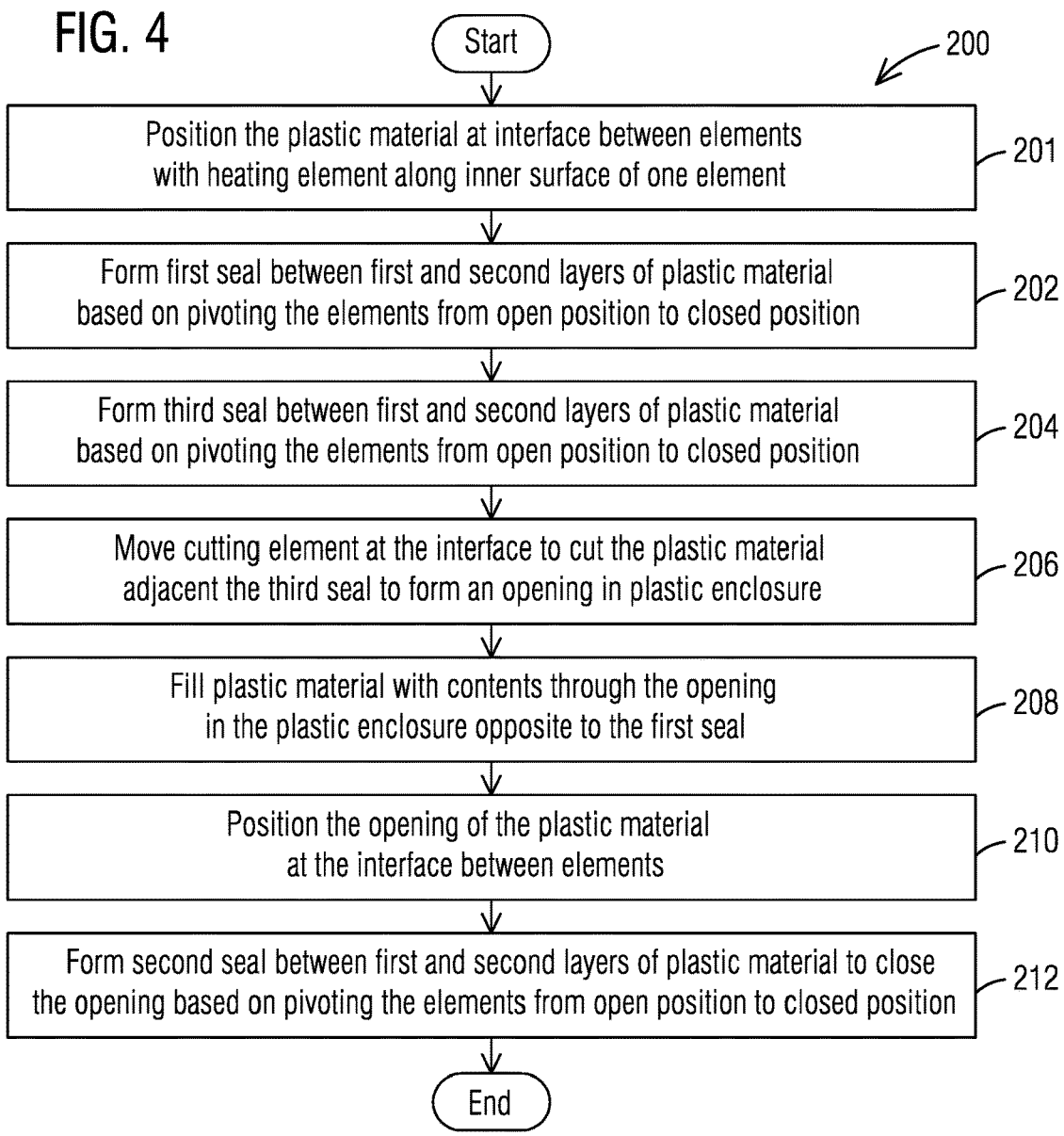

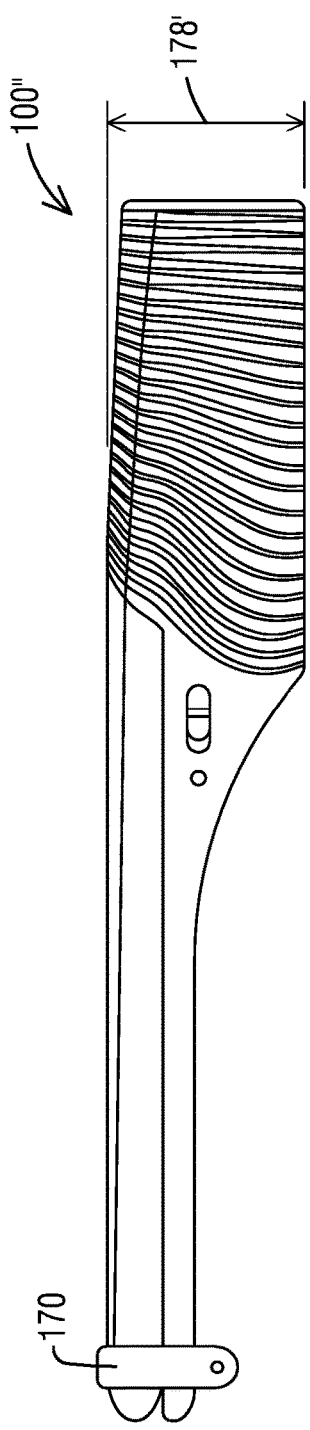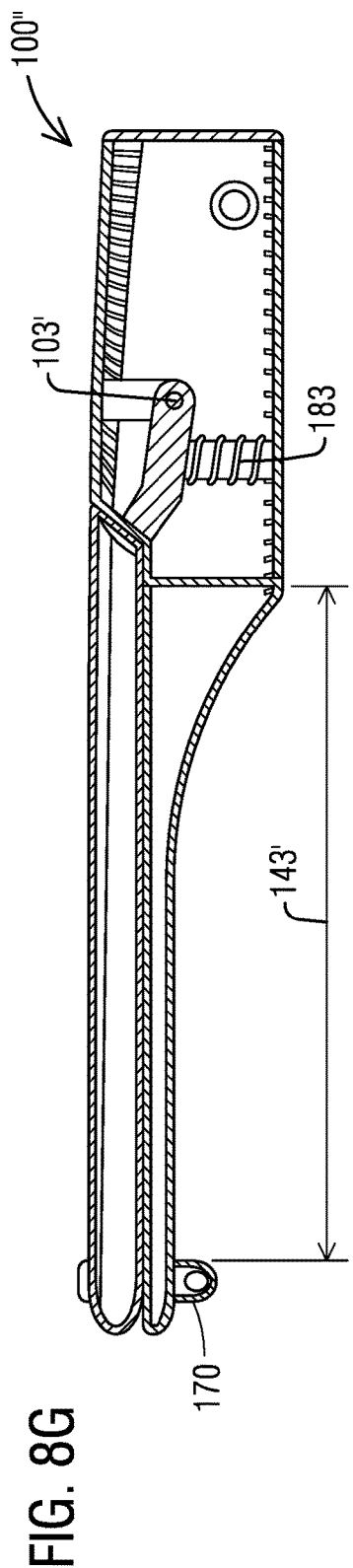
FIG. 8F  FIG. 8G  FIG. 8H

SYSTEM AND METHOD FOR SEALING A PLASTIC ENCLOSURE

CROSS REFERENCE TO RELATED APPLICATIONS

This application claims the benefit of provisional application 62/513,614, filed Jun. 1, 2017, the entire contents of which are incorporated herein.

BACKGROUND

Conventional packages are available for temporary storage of condiments, snacks, or personal products. For example, plastic containers (e.g. Tupperware®) are available in which such products can be temporarily stored. Additionally, conventional bags (e.g. Ziploc®) are available in which such products can be temporarily stored.

SUMMARY

Techniques are provided for sealing a plastic enclosure that can be used to transport a range of products including condiments, snacks or personal products. The inventor noted that the conventional containers used to transport such products are deficient. For example, the inventor recognized that conventional plastic containers (e.g. Tupperware®) have notable drawbacks, including that they are cumbersome to carry around, require repeated washing and take up large amounts of cabinet space. Additionally, in another example, the inventor recognized that conventional bags (e.g. Ziploc®) have notable drawbacks, including that they are not effective at safely transporting liquid products and come in fixed sizes and thus are not properly sized to fit certain products (e.g. spices).

In a first embodiment, an apparatus is provided for sealing an enclosure of plastic material. The apparatus includes a handle including a pair of elements pivotally coupled together at a first end of the elements. The apparatus further includes a heating element positioned along an inner surface of at least one element and connected to a power source, where a longitudinal axis of the heating element is oriented parallel to a longitudinal axis of the element. Upon positioning plastic material including a first plastic layer and a second plastic layer at an interface between the pair of second elements and upon pivoting the pair of first elements from an open position to a closed position, the heating element increases a temperature at the interface to melt the plastic material and form a seal between the first plastic layer and the second plastic layer.

In a second embodiment, an apparatus is provided for sealing an enclosure of plastic material. The apparatus includes a pair of elements pivotally coupled together at a first end of the elements. The apparatus further includes a heating element positioned along an inner surface of one element and connected to a power source. The apparatus further includes a cutting element positioned at an inner surface of one element and is configured to move relative to the inner surface of the element to cut the plastic material along the interface adjacent the seal. Upon positioning plastic material including a first plastic layer and a second plastic layer at the interface between the elements and upon pivoting of the elements from an open position to a closed position, the heating element increases a temperature at the interface to melt the plastic material and form a seal between the first plastic layer and the second plastic layer.

In a third embodiment, a method is provided for sealing an enclosure of plastic material. The method includes positioning the plastic material including a first plastic layer and a second plastic layer at an interface between the pair of elements. The method further includes pivoting the pair of elements from an open position to a closed position such that the heating element increases a temperature at the interface to melt the first plastic layer and the second plastic layer. The method further includes forming a first seal between the first plastic layer and the second plastic layer based on the melting of the first plastic layer and the second plastic layer. The method further includes filling the enclosure of the plastic material with contents through an opening in the plastic material and positioning the plastic material including the first plastic layer and the second plastic layer at the interface. The method further includes pivoting the pair of elements from the open position to the closed position such that the heating element increases the temperature at the interface to melt the first plastic layer and the second plastic layer. The method further includes forming a second seal between the first plastic layer and the second plastic layer based on the melting of the first plastic layer and the second plastic layer, where the enclosure of plastic material is formed between the first seal and the second seal.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 3F is an image that illustrates an example of a top view of the enclosure of the plastic material including the first seal and the second seal, according to an embodiment;

FIG. 3G is a block diagram that illustrates an example of a top view of the enclosure of the plastic material including interior seals between the first seal and the second seal, according to an embodiment;

FIG. 4 is a flow chart that illustrates an example of a method for sealing an enclosure of plastic material, according to an embodiment.

FIG. 8F is an image that illustrates an example of a side view of the system of FIG. 8A in a closed position, according to an embodiment;

FIG. 8G is an image that illustrates an example of a partial sectional view of the system of FIG. 8F in a closed position, according to an embodiment; and FIG. 8H is an image that illustrates an example of a top view of the system of FIG. 8F, according to an embodiment.

DETAILED DESCRIPTION

Figure 1A:
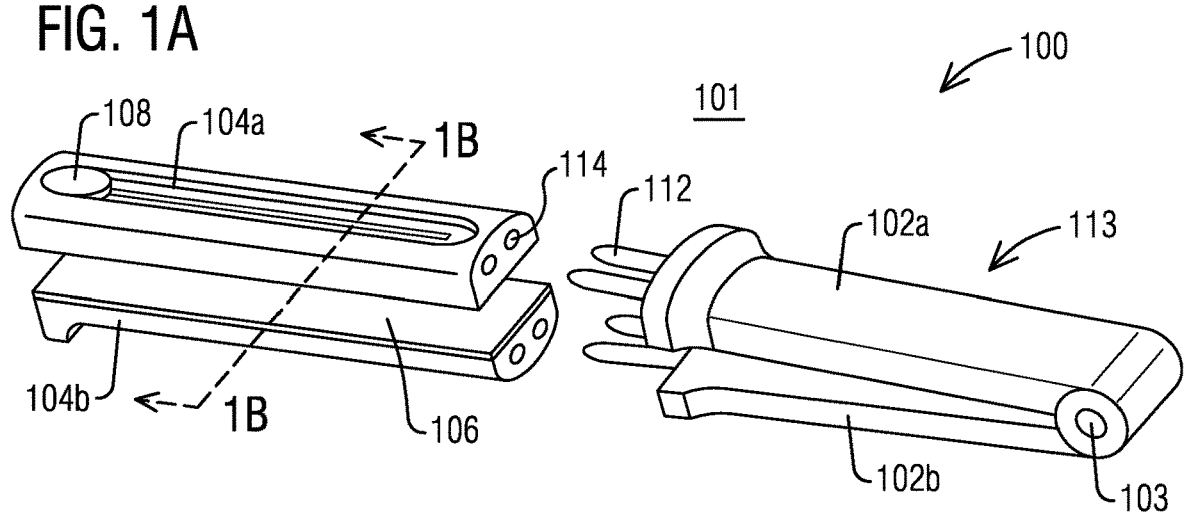
FIG. 1A is an image that illustrates an example of a perspective view of a system for sealing an enclosure of plastic material in an open position, according to an embodiment.

A method and apparatus are described for sealing an enclosure of plastic material. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4. Additionally, the term "orthogonal" is used to indicate an angle between two directions in a range of 90 degrees±10 degrees or in a range of 90 degrees±20 degrees. Additionally, the term "parallel" is used to indicate an angle between two directions in a range of 0 degrees±10 degrees or in a range of 0 degrees±20 degrees.

Some embodiments of the invention are described below in the context of sealing an enclosure of plastic material. For purposes of this description, "enclosure" means an enclosed volume (e.g. rectangular volume) defined by plastic material. In other embodiments, "enclosure" means an enclosed volume defined by a non-plastic material, such as plastic and mylar materials. In some embodiments, the enclosure is defined by one or more seals in the plastic material, where the seals are formed between layers of the plastic material and define one or more boundaries of the enclosure. In some embodiments, the enclosure is a plastic bag defined by one or more seals in plastic material that includes a first plastic layer and a second plastic layer. In other embodiments, the enclosure is defined as a sub-enclosure or sub-volume within a larger enclosure, e.g. an interior volume or sub-enclosure within a plastic bag formed between two interior seals or between an interior seal and a seal at one end or side of the bag. In other embodiments, the enclosure is a capsule defined by one or more seals in plastic material that is a straw, e.g. plastic straw. However, the invention is not limited to this context. For purposes of this description, "plastic material" means material made of plastic that includes multiple layers. In some embodiments, the plastic material includes a first plastic layer and a second plastic layer that are sealed along opposite sides. In other embodiments, the plastic material is a plastic straw. For purposes of this description, "portable" means a device that can be carried by a person, such as in a standard handbag and/or a device that can be operated while being carried by a person. In some embodiments, "portable" means that the device can be used to perform each step of a method to seal a plastic enclosure while being carried by a person. In some embodiments, "portable" means that the device has a largest dimension (e.g. length, width, height) no greater than from about 6 inches to about 12 inches. In other embodiments, "portable" means that the device has a largest dimension (e.g. length, width, height) no greater than from about 4 inches to about 14 inches. In other embodiments, "portable" means that the device has a weight no greater than about 8 ounces to about 12 ounces. In still other embodiments, "portable" means that the device has a weight no greater than about 4 ounces to about 14 ounces.

FIG. 1A is an image that illustrates an example of a perspective view of a system 100 for sealing an enclosure of plastic material in an open position 101, according to an embodiment. In some embodiments, the system 100 is portable. In one embodiment, the system 100 is portable such that it can be carried in a handbag (e.g. woman's handbag). The system 100 includes a handle 113 with a pair of first elements 102a, 102b that are pivotally coupled at one end of the elements 102a, 102b. In one embodiment, the first elements 102a, 102b are pivotally coupled together at a hinge 103. In one embodiment, the first elements 102a, 102b are made of a plastic material. In another embodiment, the first elements 102a, 102b are made of a heat resistant or insulating substrate material (e.g. ceramic, silicone, silicone rubber, etc).

Figure 1B:
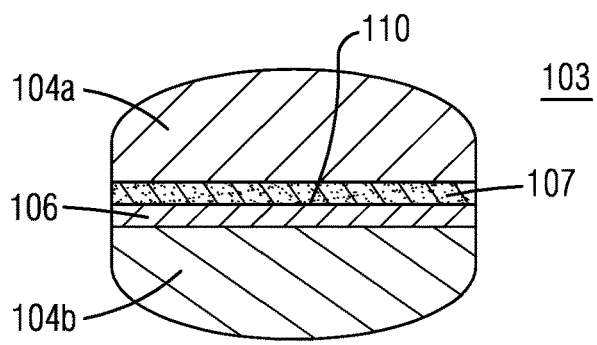
FIG. 1B is an image that illustrates an example of a cross sectional view taken along the line 1B-1B in FIG. 1A, according to an embodiment.
Figure 1C:
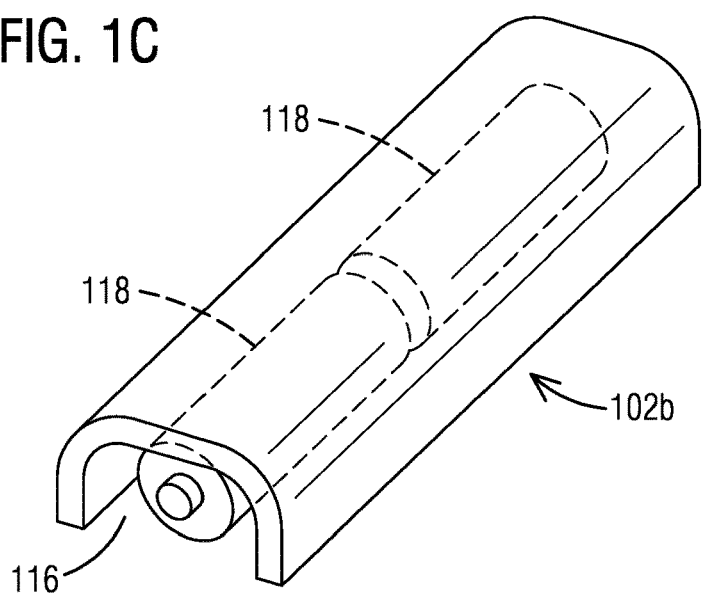
FIG. 1C is an image that illustrates an example of a sectional view of a first element of the system of FIG. 1A, according to an embodiment.
Figure 1D:
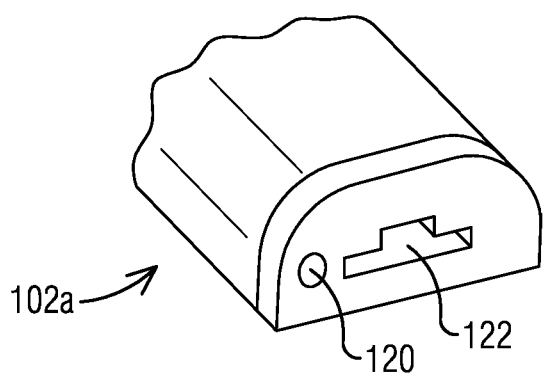
FIG. 1D is an image that illustrates an example of a perspective end view of a first element of the system of FIG. 1A, according to an embodiment.
Figure 1E:
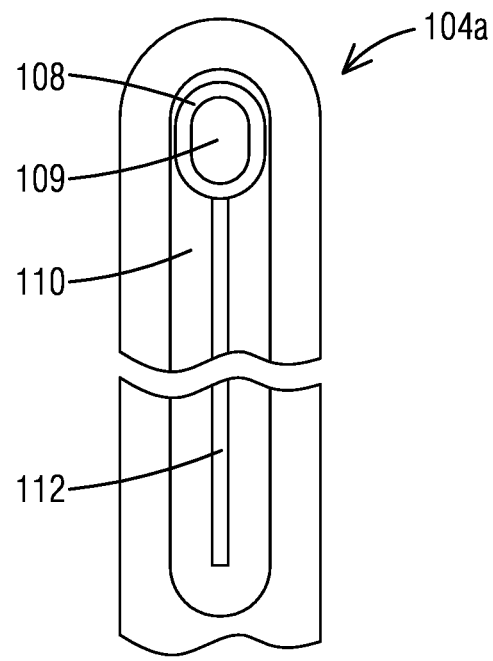
FIG. 1E is an image that illustrates an example of a top view of a second element of the system of FIG. 1A, according to an embodiment.
Figure 1F:
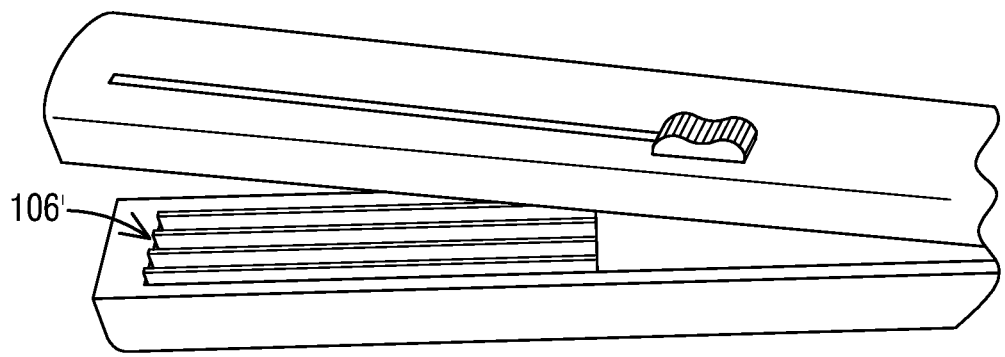
FIG. 1F is an image that illustrates an example of a perspective view of a system for sealing an enclosure of plastic material in an open position, according to an embodiment.
Figure 1G:
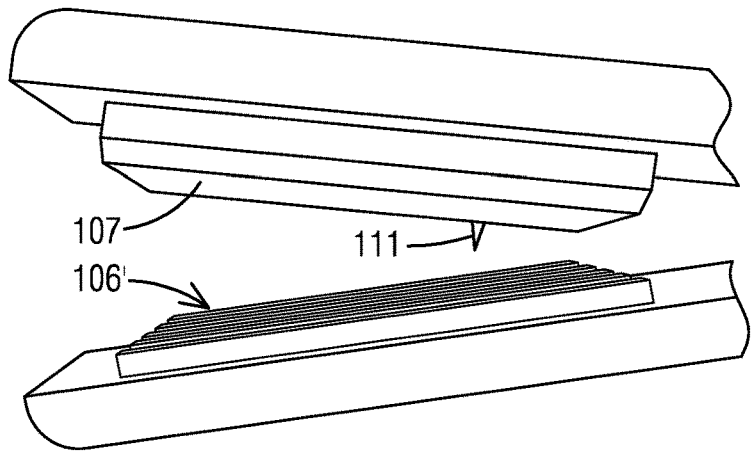
FIG. 1G is an image that illustrates an example of a side view of the second elements of the system of FIG. 1F, according to an embodiment.
Figure 1H:
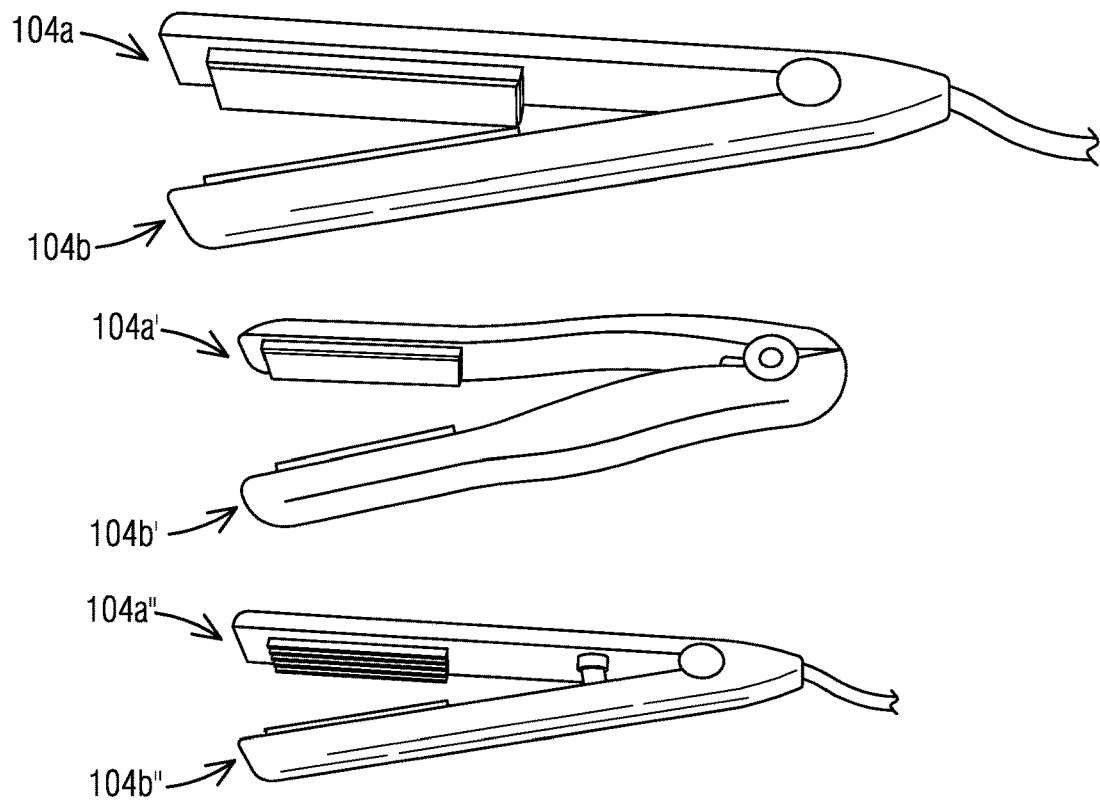
FIG. 1H is an image that illustrates an example of a perspective view of pairs of second elements of different dimension, according to an embodiment.
Figure 2A:
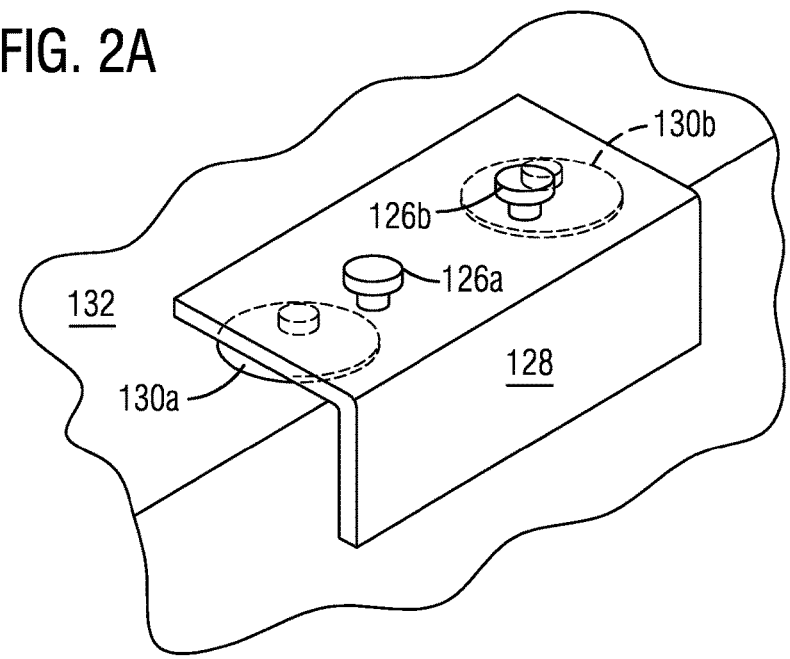
FIG. 2A is an image that illustrates an example of a perspective view of a bracket mounted to a flat surface, according to an embodiment.
Figure 2B:
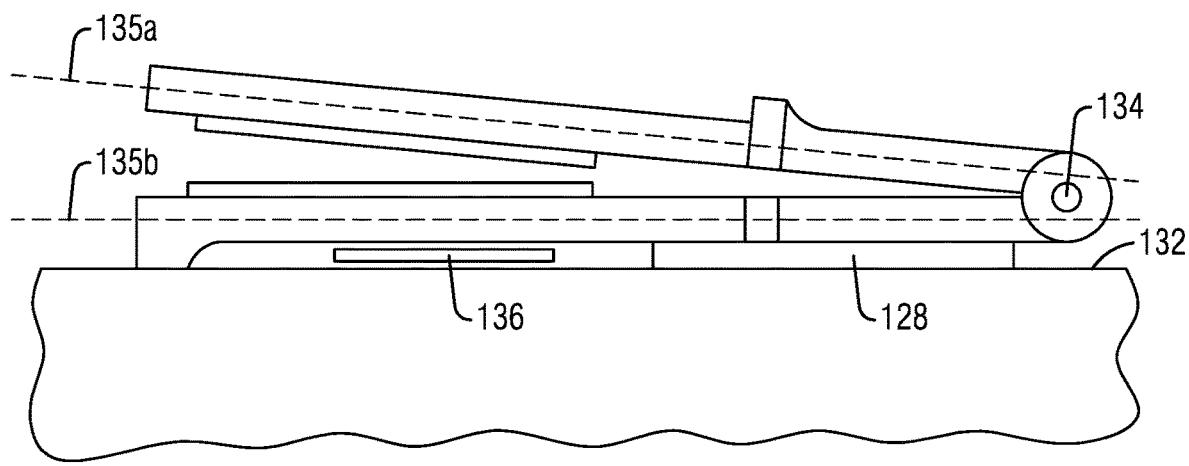
FIG. 2B is an image that illustrates an example of a side view of the system of FIG. 1A mounted to the bracket of FIG. 2A, according to an embodiment.

The system 100 also includes a pair of second elements 104a, 104b that are removably coupled to a second end of the first elements 102a, 102b so that the second elements 104a, 104b are coextensive with the first elements 102a, 102b as depicted in FIG. 2B. In some embodiments, the second elements 104a, 104b are made from the same material as the first elements 102a, 102b. In one embodiment, the first elements 102a, 102b and second elements 104a, 104b are integrally connected as one pair of elements pivotally coupled at the hinge 103. FIG. 1H is an image that illustrates an example of a perspective view of pairs of second elements 104 of different dimension, according to an embodiment. In some embodiments, the pair of second elements 104a, 104b have a larger dimension that is used to seal plastic material 136 having a larger dimension (e.g. 6" wide bag), the pair of second elements 104a', 104b' have a medium dimension that is used to seal plastic material 136 having a medium dimension (e.g. 3" wide bag) and the pair of second elements 104a", 104b" have a small dimension that is used to seal plastic material 136 having a small dimension (e.g. straw).

In some embodiments, a heating element 106 is positioned along an inner surface of one of the second elements 104a, 104b. In this embodiment, a sponge material 107 (FIG. 2E) is positioned along an inner surface of the other second element 104a. In an example embodiment, the sponge material 107 is a sponge-like material (e.g. silicone) that is heat resistant. In other embodiments, the heating element 106 is positioned along the inner surface of both second elements 104a, 104b. In some embodiments, the heating element 106 has a flat planar surface. In other embodiments, the heating element has a crimping surface including one or more ridges. In an embodiment, the ridges of the crimping surface form a plurality of sealing interfaces in the plastic material 136 over the seal. FIG. 1F is an image that illustrates an example of a heating element 106' including a crimping surface with a plurality of ridges. In some embodiments, the crimping surface is made from a ceramic coated material. FIG. 1G is an image that illustrates an example of a side view of the second elements 104 of the system of FIG. 1F, according to an embodiment. The sponge material 107 and cutting element 111 are also depicted in FIG. 1G.

The heating element 106 is connected to a power source. In some embodiments, the pair of first elements 102*a*, 102*b* include a first connector 112 that is electrically connected to a power source and the pair of second elements 104*a*, 104*b* include a second connector 114 electrically connected to the heating element 106. In an example embodiment, the first connector 112 is a male connector and the second connector 114 is a female connector. In other embodiments, the first connector 112 is a female connector and the second connector 114 is a male connector. In still other embodiments, connectors 112, 114 other than male/female connectors can be used to electrically connect the elements 102*a*, 102*b* with the elements 104*a*, 104*b*. Upon connection of the first connector 112 with the second connector 114, the heating element 116 is electrically connected with the power source.

In some embodiments, the power source is an internal power source housed within the system 100. In one embodiment, the internal power source is housed within one of the first elements 102*a*, 102*b*. FIG. 1C is an image that illustrates an example of a sectional view of the first element 102*b* of the system 100 of FIG. 1A, according to an embodiment. In one embodiment, the first element 102*b* includes a compartment 116 to house a power source (e.g. one or more batteries 118). In an example embodiment, two AA rated batteries 118 are housed in the compartment 116. In other embodiments, the power source is an external power source and one of the first elements 102*a*, 102*b* is connected to the external power source. FIG. 1D is an image that illustrates an example of a perspective end view of the first element 102*a* of the system 100 of FIG. 1A, according to an embodiment. In one embodiment, the first element 102*a* includes an electrical inlet (e.g. USB port 122) for connection to an external power source. In other embodiments, the USB port 122 is used to charge the internal power source (e.g. batteries 118) while the internal power source (or external power source) provides serves as the power source for the heating element 106.

The system 100 also includes a cutting element 111 positioned along an inner surface of the second element 104*a*. FIG. 1E is an image that illustrates an example of a top view of the second element 104*a* of the system of FIG. 1A, according to an embodiment. In some embodiments, the second element 104*a* includes a slot 112 to slidably receive the cutting element. In these embodiments, an outer surface of the second element 104*a* includes a button 108 (with an optional button recess 109) slidably received in a recess 110, where the button 108 is connected to the cutting element 111 through the slot 112. In other embodiments, the recess 110 is not provided and the button 108 is configured to slide along the outer surface of the second element 104*a*. The cutting element 111 slides along the inner surface of the second element 104*a* when a user slides the button 108 along the recess 110.

During operation of the system 100, the first elements 102*a*, 102*b* are initially positioned in an open position 101 (FIG. 1A) with an angle between the first elements 102*a*, 102*b*. In some embodiments, the open position 101 is the default position of the first elements 102*a*, 102*b* such that the first elements 102*a*, 102*b* are in the open position 101 when no external force is applied. FIG. 2B is an image that illustrates an example of a side view of the system 100 of FIG. 1A in the open position 101. In some embodiments, the first element 102*a* and second element 104*a* are coextensive such that they share a common longitudinal axis 135*a* and the first element 102*b* and second element 104*b* are coextensive such that they share a common longitudinal axis 135*b*. Additionally, in other embodiments, a rotational axis 134 (orthogonal to the plane of FIG. 2B) of the first elements 102*a*, 102*b* is about perpendicular to the longitudinal axes 135*a*, 135*b*.

Figure 2C:
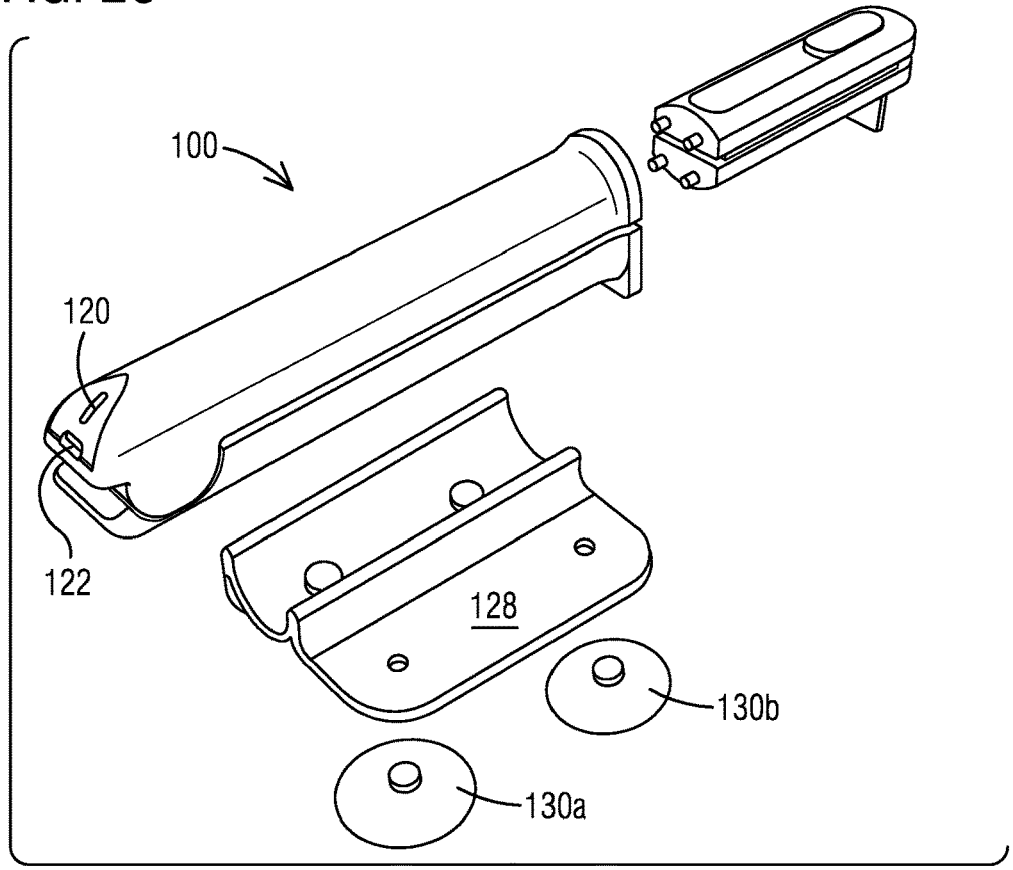
FIG. 2C is an image that illustrates an example of an exploded view of the system of FIG. 1A and the bracket of FIG. 2A, according to an embodiment.
Figure 2D:
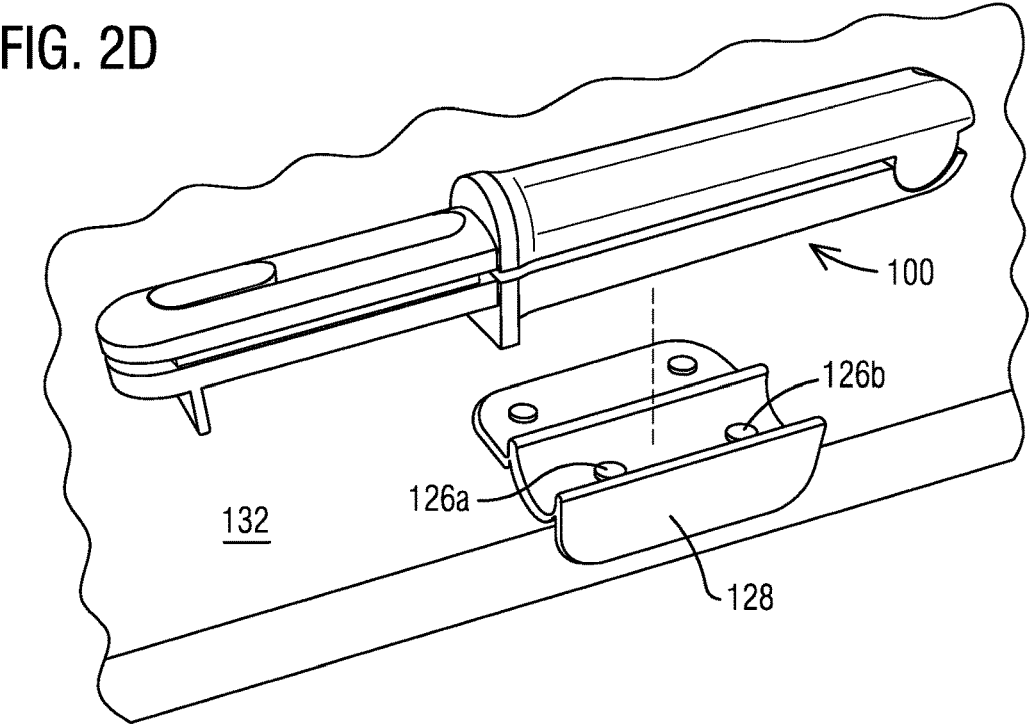
FIG. 2D is an image that illustrates an example of a perspective view of the system of FIG. 1A and the bracket of FIG. 2A mounted to a flat surface, according to an embodiment.
Figure 2E:
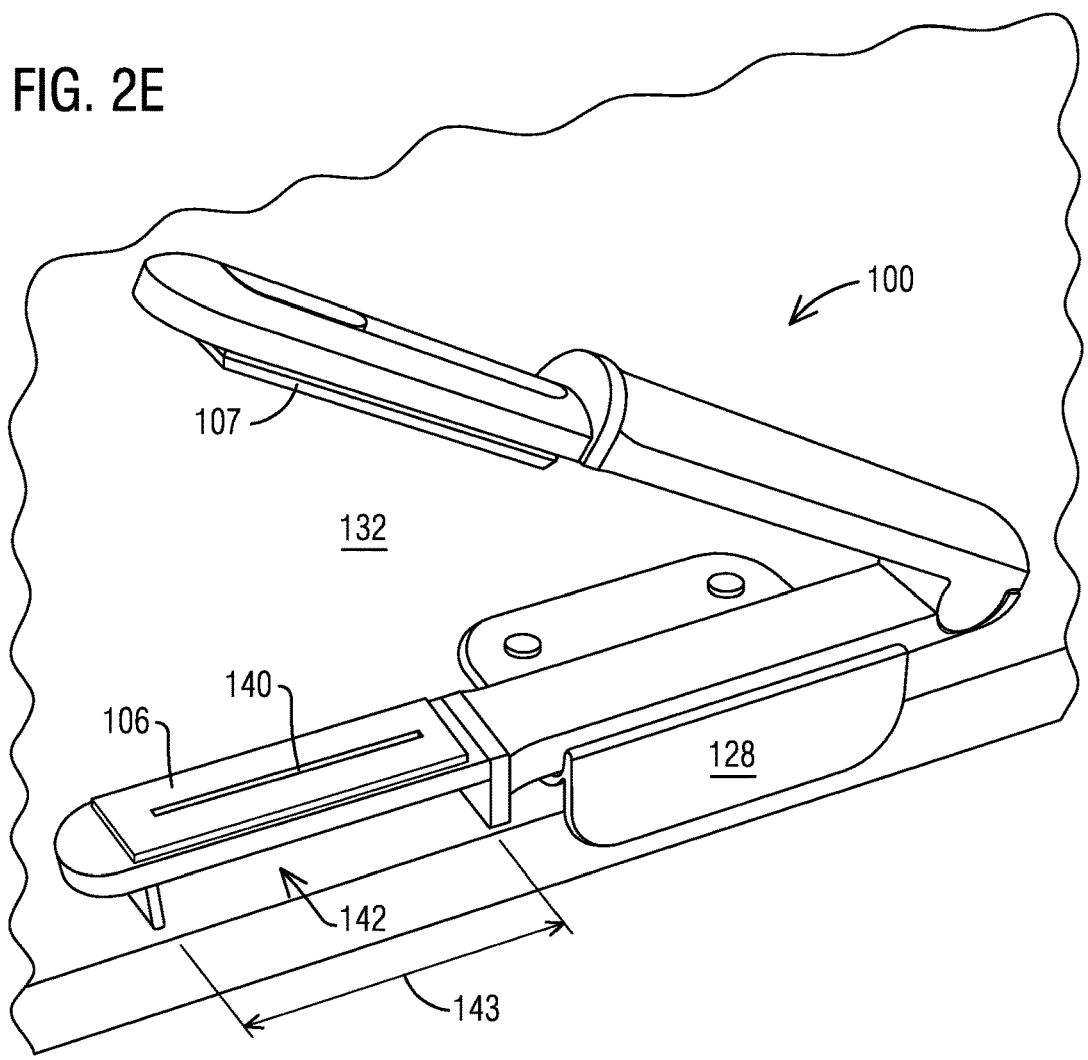
FIG. 2E is an image that illustrates an example of a perspective view of the system of FIG. 1A mounted to the bracket of FIG. 2A in the open position, according to an embodiment.

Plastic material including a first plastic layer and second plastic layer is initially positioned at an interface between the second elements 104*a*, 104*b*. In some embodiments, the plastic material is positioned between the heat element 106 and the sponge material 107. The pair of first elements 102*a*, 102*b* are then pivoted about the hinge 103 to move the system 100 from the open position 101 (FIG. 1A) to a closed position 103 (FIG. 1B). To facilitate moving the system from the open position 101 to the closed position 103, in some embodiments the heating element 106 includes a slot 140 (FIG. 2E) to slidably receive the cutting element on the inner surface of the second element 104*a*. In some embodiments, in the closed position 103 the heating element 106 moves within a threshold distance of the sponge material 107. Although FIG. 2E depicts the slot 140 provided along the heating element 106, in other embodiments the slot 140 is spaced apart from the heating element 106 along the inner surface of the element 104*a*.

In some embodiments, the system 100 is held in a hand of the user (e.g. hands-on operation). In other embodiments, the system 100 is used without being held by the user (e.g. hands-free operation). In these embodiments, the system 100 is mounted to a bracket 128 and the bracket 128 is mounted to a flat surface (e.g. counter). FIG. 2A is an image that illustrates an example of a perspective view of a bracket 128 mounted to a level surface (e.g. counter 132), according to an embodiment. The bracket 128 is mounted to the counter 132. In one embodiment, the bracket 128 is mounted to the counter 132 with a pair of suction cups 130*a*, 130*b*. Each suction cup 130 includes a base portion that is secured to the counter 132 and a nipple portion that is received with a respective opening in the bracket 128 (FIGS. 2C-2D). The bracket 128 includes a pair of mating keys 126*a*, 126*b* (FIG. 2A) and the first element 102*b* includes a pair of key holes that are sized to slidably receive the mating keys 126*a*, 126*b* into a locked position to securely mount the first elements 102*a*, 102*b* to the bracket 128. FIG. 2B depicts the first elements 102*a*, 102*b* and second elements 104*a*, 104*b* securely mounted to the bracket 128 and the bracket 128 securely mounted to the counter 132.

Figure 5A:
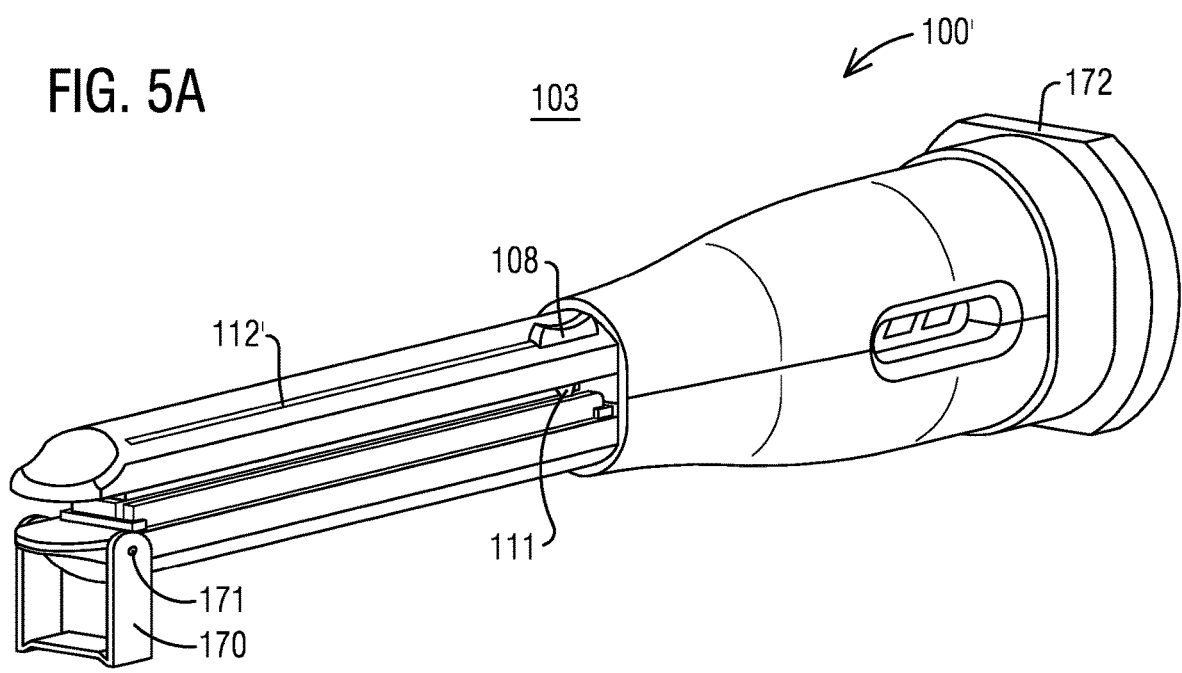
FIG. 5A is an image that illustrates an example of a perspective view of a system for sealing an enclosure of plastic material in a closed position, according to an embodiment.
Figure 5B:
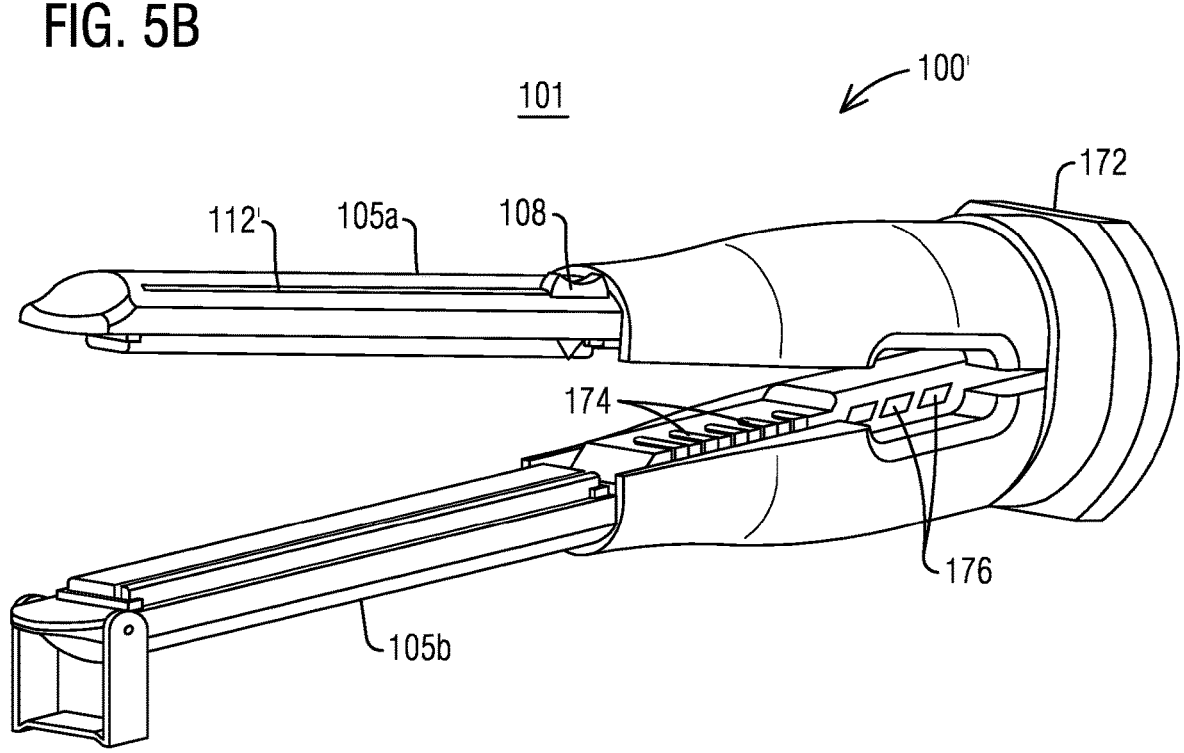
FIG. 5B is an image that illustrates an example of a perspective view of the system of FIG. 5A in an open position, according to an embodiment.
Figure 5C:
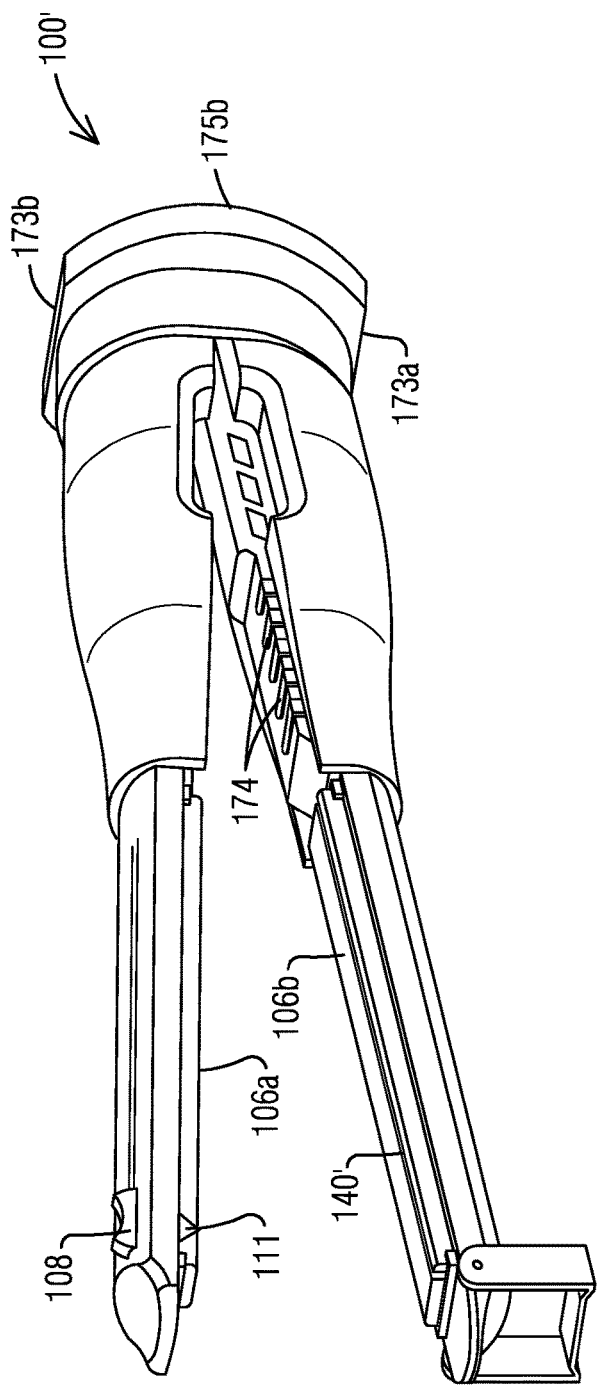
FIG. 5C is an image that illustrates an example of a perspective view of the system of FIG. 5B with the cutting element slid from a first end to a second end of a slot in one of the elements, according to an embodiment.

FIGS. 5A-5G are images that illustrate an example of different views of a system 100' for sealing an enclosure of plastic material, according to an embodiment. The system 100' is similar to the system 100 previously discussed, with the exception of the features discussed herein. Unlike the system 100 with a pair of first elements 102 and a pair of second elements 104 connected to the pair of first elements 102 using connectors 112, 114, the system 100' includes one pair of elements 105*a*, 105*b*. In an embodiment, the element 105*a* integrates the element 102*a* and 104*a* and the element 105*b* integrates the element 102*b* and 104*b*. Additionally, unlike the system 100 where the slot 112 and button 108 are arranged near a center of a width of the second element 104*a* (FIG. 1E), in one embodiment the system 100' features a slot 112' and button 108 that are offset by a spacing 188 (FIG. 6D) from a center 189 of a width of the element 105*a*. Thus, the cutting element 111 (positioned in the slot 112') is offset by the spacing 188 from the center 189 of the width of the element 105*a*. In an embodiment, the spacing 188 is about ⅛" or in a range from about ¹⁄₁₆" to about ¼" or in a range from about ¹⁄₃₂" to about ½" or in a range from about ¹⁄₆₄" to about 1". In other embodiments, the slot 112' and button 108 are centered along the center 189 of the width of the element 105*a*.

In an embodiment, the system 100' includes a U-shaped member 170 that is rotatably fixed to the element 105*b* about a pivot axis 171. In one embodiment, the U-shaped member 170 is fixed to the element 105*b* adjacent a second end 177*b* of the element 105*b* and can rotate from a first position (FIG. 8F) to clasp the elements 105*a*, 105*b* together when they are in the closed position 103 to a second position (FIG. 5D) to support a second end 177*b* of the elements 105 on a level surface 180 (e.g. table) when the system 100' is placed on the level surface 180.

In another embodiment, the system 100' includes a base 172 adjacent to a first end 177*a* of the elements 105 that is opposite from the second end 177*b*. In an embodiment, the base 172 has an outer diameter 178 (FIG. 5D) that is greater than an outer diameter of the elements 105 between the first and second ends 177*a*, 177*b*. Additionally, in an embodiment, the base 172 includes a pair of flat surfaces 173*a*, 173*b* that are spaced apart by a width dimension (e.g. outer diameter 178) and a pair of arcuate surfaces 175*a*, 175*b* that are spaced apart by a length dimension that is greater than the width dimension. In an example embodiment, the width dimension is about 2" or in a range from about 1" to about 3" and the length dimension is about 2.5" or in a range about 1.5" to about 2.5". In some embodiments, the length dimension is about the same as the width dimension. In an example embodiment, a height of the U-shaped member 170 is sized based on a difference between the outer diameter 178 of the base 172 and the outer diameter of the member 105*b* at the pivot axis 171. In another embodiment, one or more dimensions (e.g. outer diameter 178) of the base 172 are sized so that the system 100' can be vertically mounted on the level surface 180 and the system 100' is relatively stable in the vertical orientation. In some embodiments, a length of the system 100' (e.g. length between the ends 177*a*, 177*b*) is about 11.5" or in a range from about 9.5" to about 13.5". In other embodiments, a length of the heating elements 106*a*, 106*b* is about 6.5" or in a range from about 4.5" to about 8.5". In still other embodiments, a length of the slots 112', 140' are about 6.5" or in a range from about 4.5" to about 8.5".

In an embodiment, the system 100' features one or more heat settings 174 to adjust a temperature of the heating elements 106*a*, 106*b* and/or one or more electrical inlets 176 (e.g. USB port). The heat settings 174 and/or the electrical inlets 176 are advantageously positioned along a side of the system 100' so to be accessible when the system 100' is mounted on the base 172 in a vertical orientation on the level surface 180.

Figure 5D:
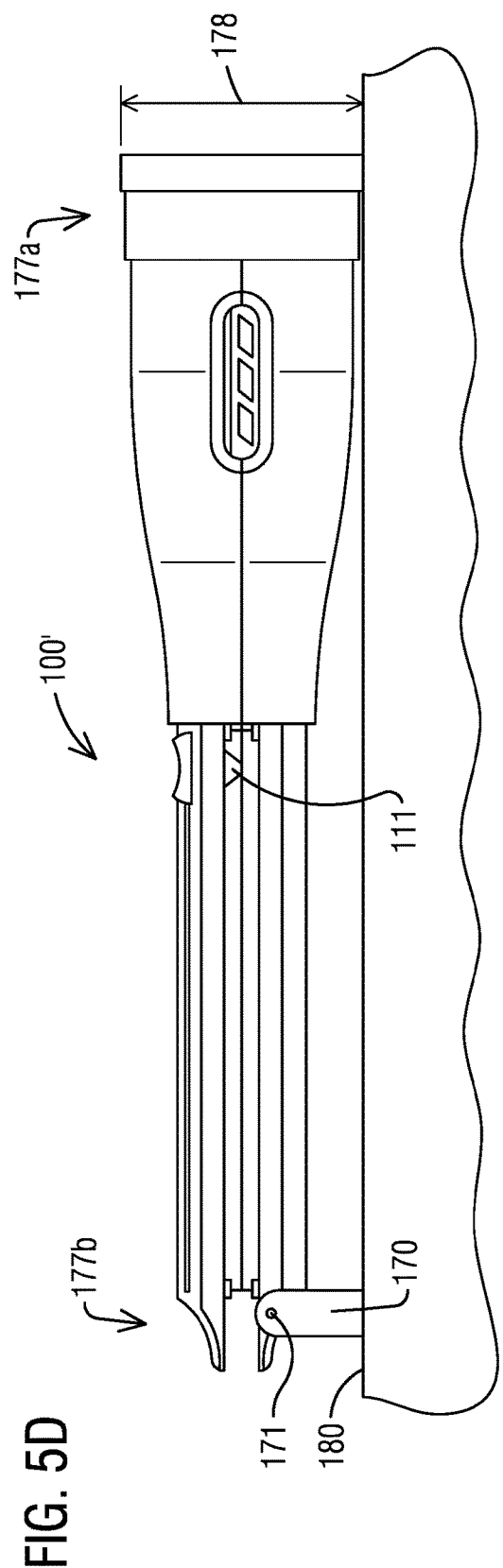
FIG. 5D is an image that illustrates an example of a side view of the system of FIG. 5A on a level surface, according to an embodiment.
Figure 6A:
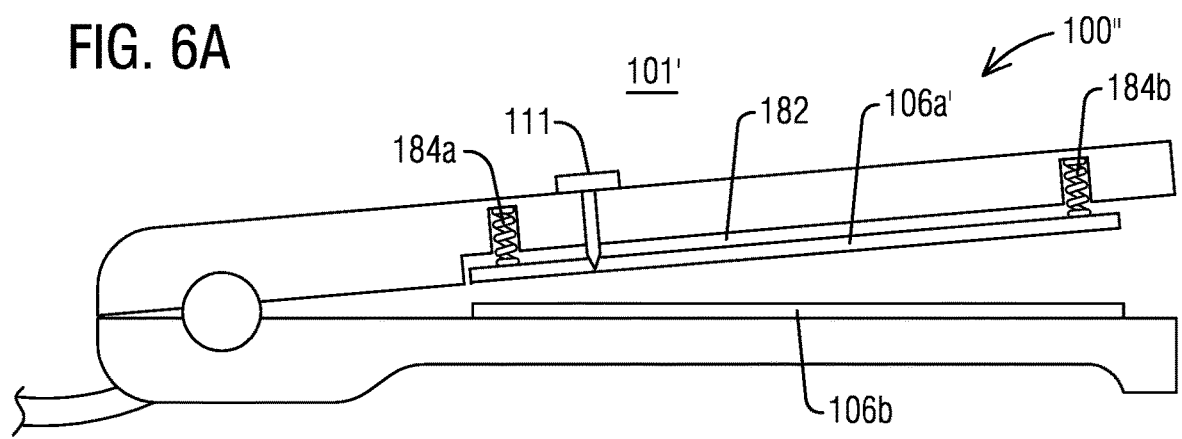
FIG. 6A is an image that illustrates an example of a side view of a system for sealing an enclosure of plastic material in an open position, according to an embodiment.
Figure 6B:
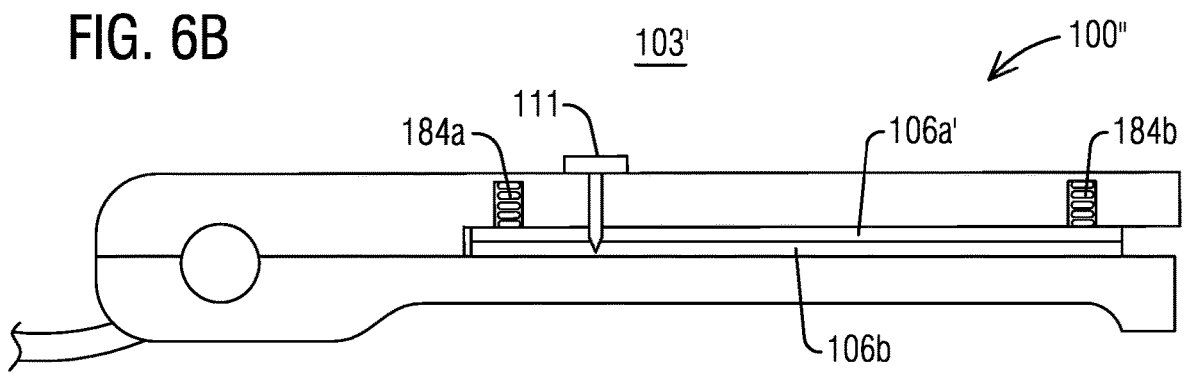
FIG. 6B is an image that illustrates an example of a side view of the system of FIG. 6A in a closed position, according to an embodiment.

As depicted in FIG. 5D, one or more dimensions of the base 172 (e.g. outer diameter 178) and one or more dimensions of the U-shaped member 170 (e.g. height) are sized so that the pair of elements 105 are supported on the level surface 180 in the closed position 101 such that the pair of elements 105 are about parallel to the level surface 180.

Figure 5E:
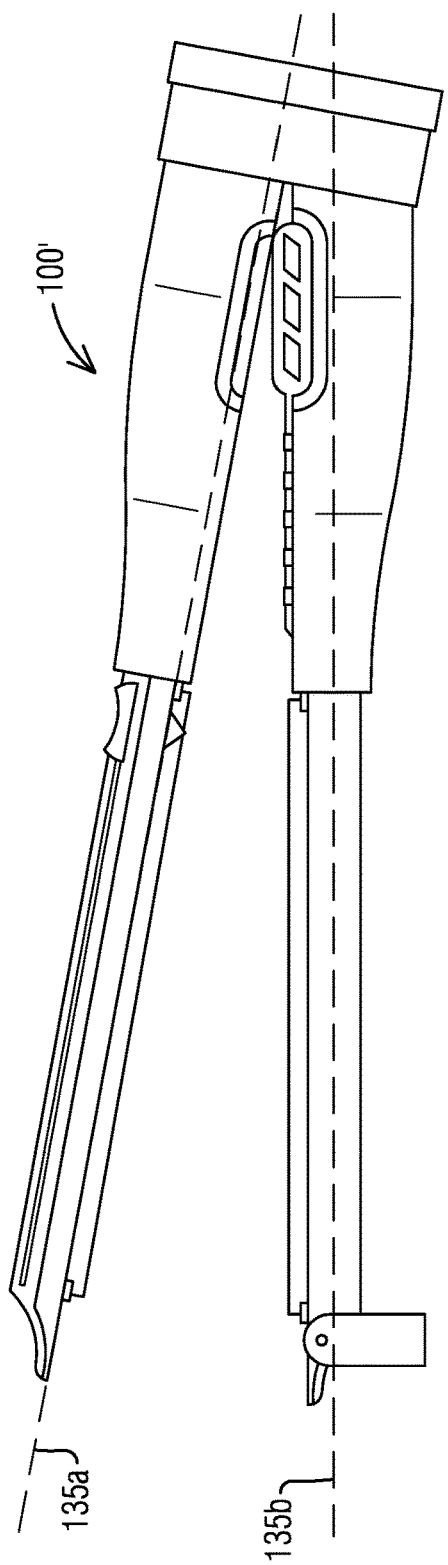
FIG. 5E is an image that illustrates an example of a side view of the system of FIG. 5A in an open position, according to an embodiment.
Figure 5F:
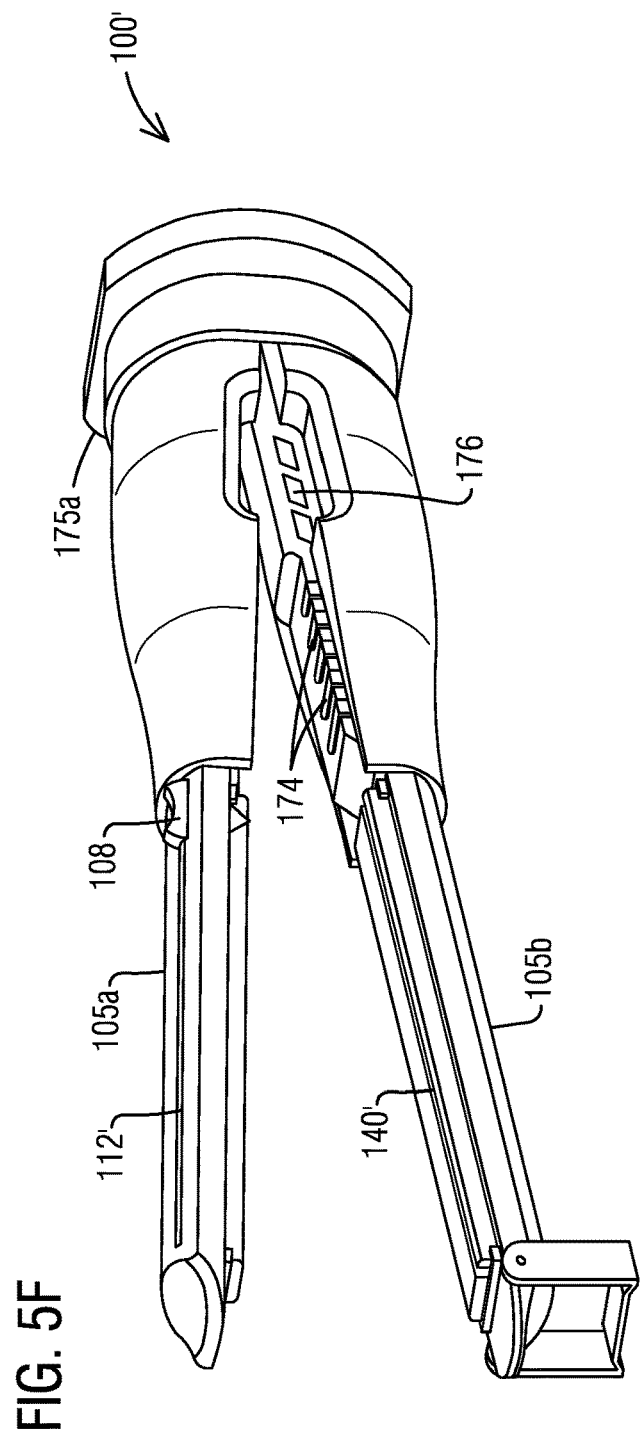
FIG. 5F is an image that illustrates an example of a top perspective view of the system of FIG. 5A in an open position, according to an embodiment.
Figure 5G:
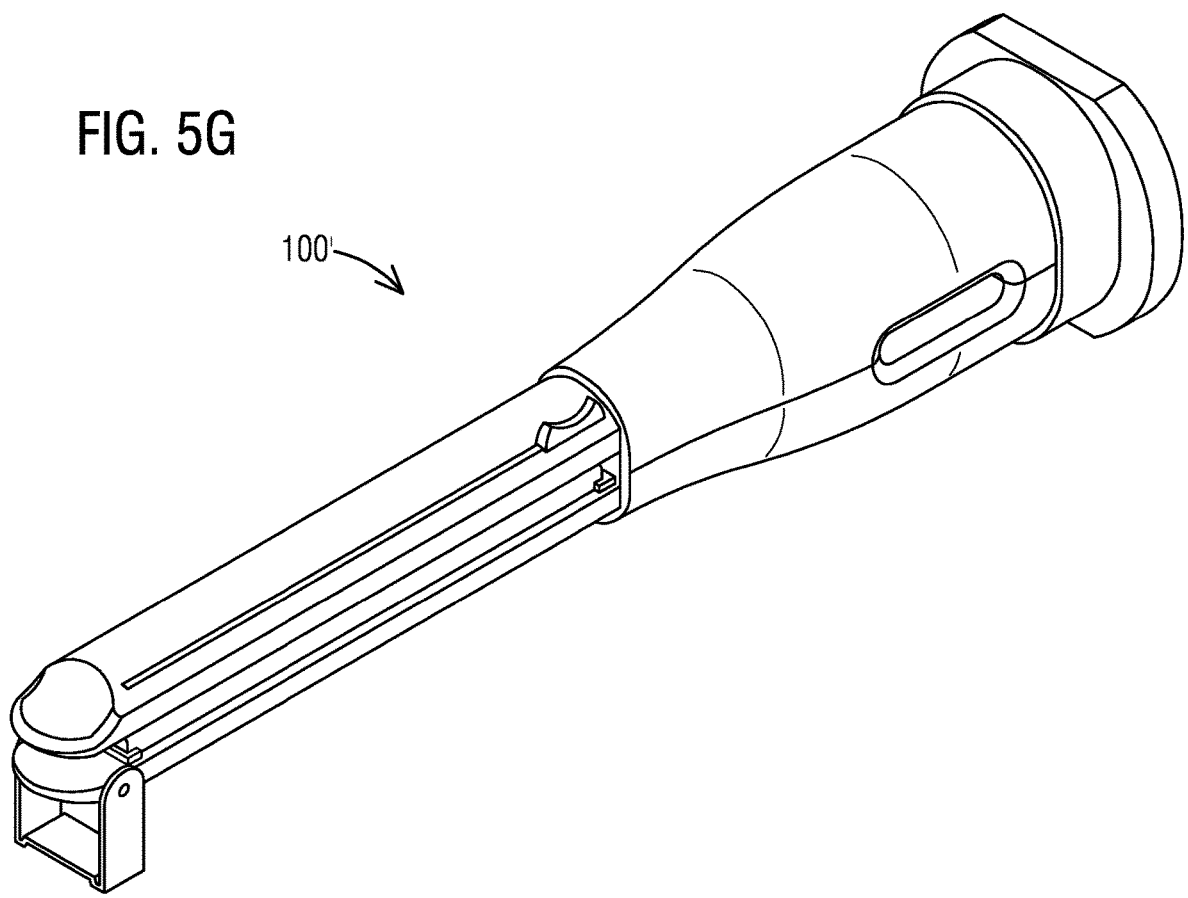
FIG. 5G is an image that illustrates an example of a top perspective view of the system of FIG. 5A in a closed position, according to an embodiment.

As depicted in FIG. 5C, in one embodiment a plurality of heating elements 106*a*, 106*b* are provided along the inner surface of the respective elements 105*a*, 105*b*. In one embodiment, the heating elements 106*a*, 106*b* include longitudinal axes that are oriented parallel to the longitudinal axes 135*a*, 135*b* of the respective elements 105*a*, 105*b* (FIG. 5E). In an embodiment, "longitudinal axis" of the heating elements 106*a*, 106*b* is defined as an axis aligned with a length dimension (e.g. length 143 in FIG. 2E for heating element 106) and orthogonal to a width dimension that is smaller than the length dimension of the heating elements 106*a*, 106*b*. In some embodiments, only one heating element 106 is provided along the inner surface of only one of the elements 105. In other embodiments, multiple heating elements are provided along the inner surface of each element 105.

Figure 6C:
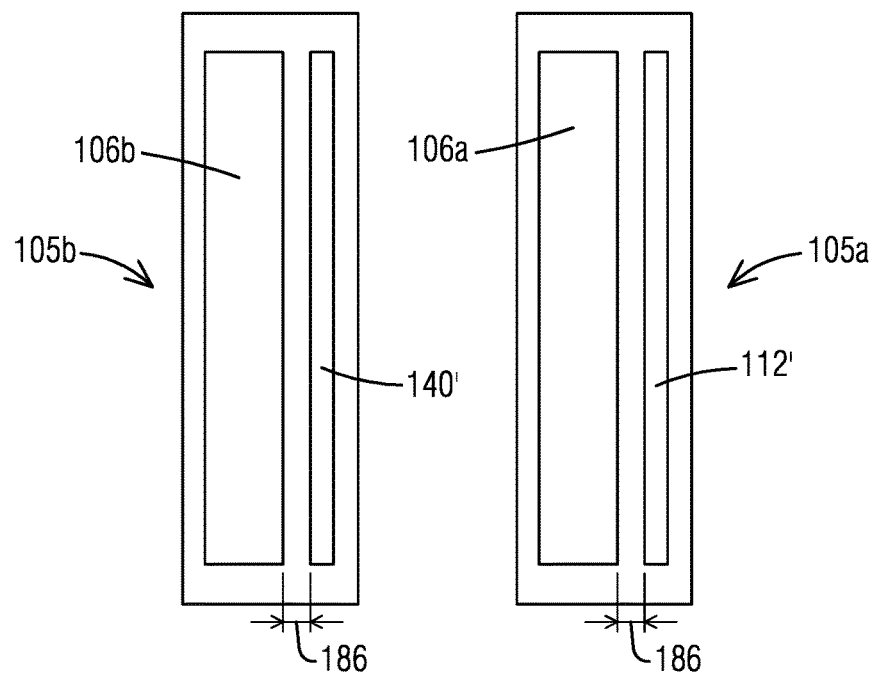
FIG. 6C is an image that illustrates an example of a plan view of an inner surface of the elements of the system of FIG. 6A, according to an embodiment.
Figure 6D:
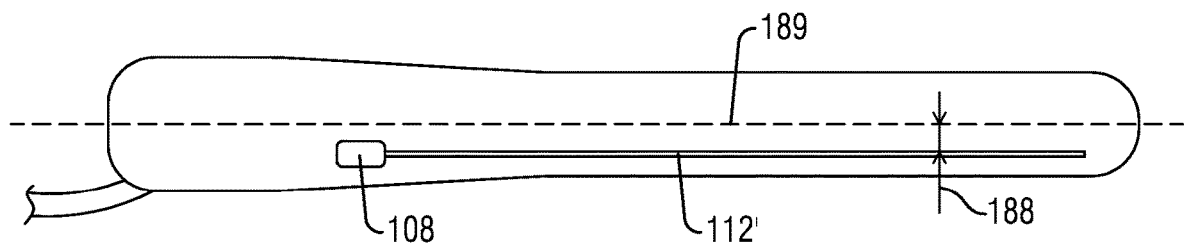
FIG. 6D is an image that illustrates an example of a top view of the system of FIG. 6A, according to an embodiment.

In one embodiment, the heating elements 106*a*, 106*b* have a width that is about the same as a width of the elements 105*a*, 105*b*. However, in other embodiments, the heating elements 106*a*, 106*b* have a width that is less than a width of the elements 105*a*, 105*b*. FIG. 6C is an image that illustrates an example of a plan view of an inner surface of the elements 105*a*, 105*b* of the system 100', according to an embodiment. In one embodiment, the slot 112' that slidably receives the cutting element 111 and button 108 in the element 105*a* is spaced apart from the heating element 106*a* by a minimum spacing 186 along the inner surface of the element 105*a*. Similarly, the slot 140' that slidably receives the cutting element 111 as it moves along the interface 110 is spaced apart from the heating element 106*b* by the minimum spacing 186 along the inner surface of the element 105*b*. In an example embodiment, the minimum spacing 186 is about ⅛" or in a range from about ¹⁄₁₆" to about ¼" or in a range from about ¹⁄₁₆" to about ½" or in a range from about ¹⁄₃₂" to about 1". Spatial separation of the slots 112', 140' and the heating elements 106*a*, 106*b* is adjusted to advantageously ensure that heat from the elements 106*a*, 106*b* does not melt the plastic material along a cut formed by the cutting element 111. Thus, the minimum spacing 186 ensures that a cut formed in the plastic material by the cutting element 111 is not resealed by heat from the heating element 106*a*, 106*b*. In order embodiments, a layer of heat insulation material or a silicone layer 185 (FIG. 8C) is positioned within the minimum spacing 186 to provide thermal insulation between the heating elements 106*a*, 106*b* and the cutting element 111, to further ensure that the heat from the elements 106*a*, 106*b* does not melt the cut formed in the plastic material by the cutting element 111. In some embodiments, a length of the slot 112' and/or slot 140' is equal to or greater than a length of the heating element 106*a* and/or heating element 106*b*. This advantageously ensures that a range of movement of the cutting element 111 (e.g. length of slots 112', 140') encompasses a maximum width of a seal formed at the interface (e.g. length of heating elements 106*a*, 106*b*).

In an embodiment, the cutting element 111 of the system 100' operates in a similar manner as the cutting element 111 of the system 100 (e.g. is slid across the interface 110 using the button 108 on an outer surface of the element 105*a*, to cut the plastic material across the interface 110). However, the embodiments of the present invention include any cutting element that moves relative to the inner surface of the element 105*a* or 105*b* in order to cut the plastic material along the interface 110. In another embodiment, the element 105*a* or element 105*b* includes a spring loaded mechanism to move the cutting mechanism 111 in a direction orthogonal to the longitudinal axis 135*a* or 135*b* to cut the plastic material upon actuation of a button operatively coupled to the spring loaded mechanism.

In some embodiments, the heating elements 106*a* 106*b* are securely fixed along the inner surface of the elements 105*a*, 105*b*. In other embodiments, one or both of the heating elements 106*a*, 106*b* are movably fixed to the inner surface of the elements 105*a*, 105*b*. FIG. 6A is an image that illustrates an example of a side view of a system 100" for sealing an enclosure of plastic material in an open position 101, according to an embodiment. In one embodiment, the system 100" of FIG. 6A is similar to the system 100' with the exception of the features discussed herein. In an embodiment, unlike the system 100'the heating element 106a' is movably fixed to the inner surface of the element 105a. In one embodiment, the heating element 106a' is movably mounted to the element 105a such that a recess 182 is provided between the heating element 106a' and the inner surface of the element 105a. Additionally, one or more springs 184a, 184b are provided that extend into the recess 182 and are operatively coupled to the heating element 106a'. A cutting element 111 is provided such that a tip of the cutting element 111 is aligned with an inner surface of the heating element 106a' when the system 100" is in the open position 101. Upon moving the system 100" from the open position 101 to the closed position 103 (FIG. 6B), the heating element 106a' engages the heating element 106b at the interface 110 which causes the heating element 106a' to move in a direction orthogonal to the longitudinal axis 135a and into the recess 182. The heating element 106a' retracts relative to the cutting element 111 so that the cutting element 111 extends beyond the inner surface of the heating element 106a' in the direction orthogonal to the longitudinal axis 135a. Since the tip of the cutting element 111 extends beyond an interface 110 of the heating elements 106a, 106b, the cutting element 111 will cut the plastic material at the interface 110 when the cutting element 111 is slid across the interface 110. This arrangement advantageously ensures that the cutting element 111 is not exposed when the system 100" is in the open position 101 since the tip of the cutting element 111 does not extend beyond the inner surface of the heating element 106a'.

Figure 8A:
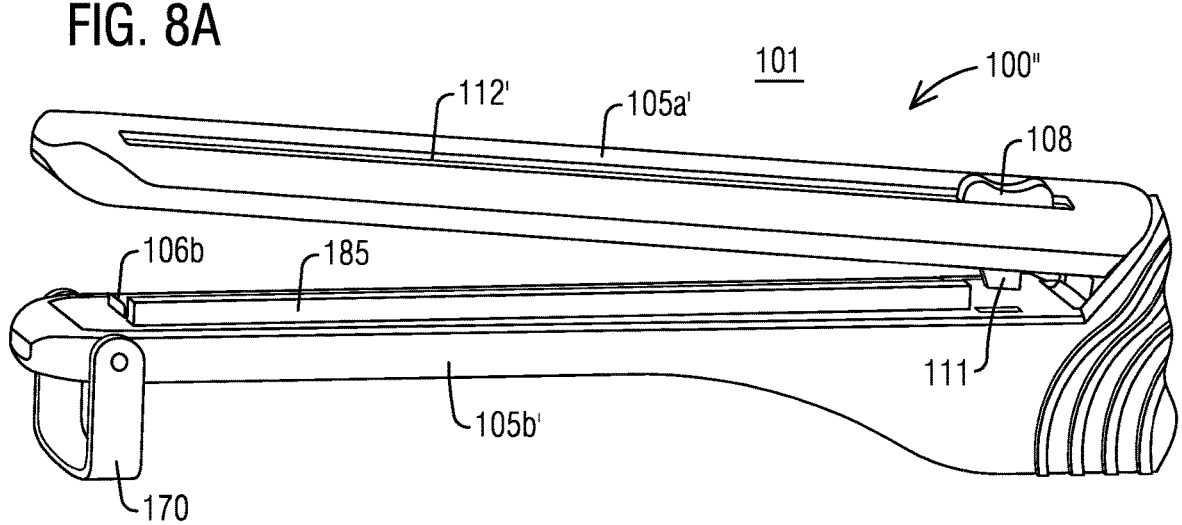
FIG. 8A is an image that illustrates an example of a perspective view of a system for sealing an enclosure of plastic material in an open position, according to an embodiment.
Figure 8B:
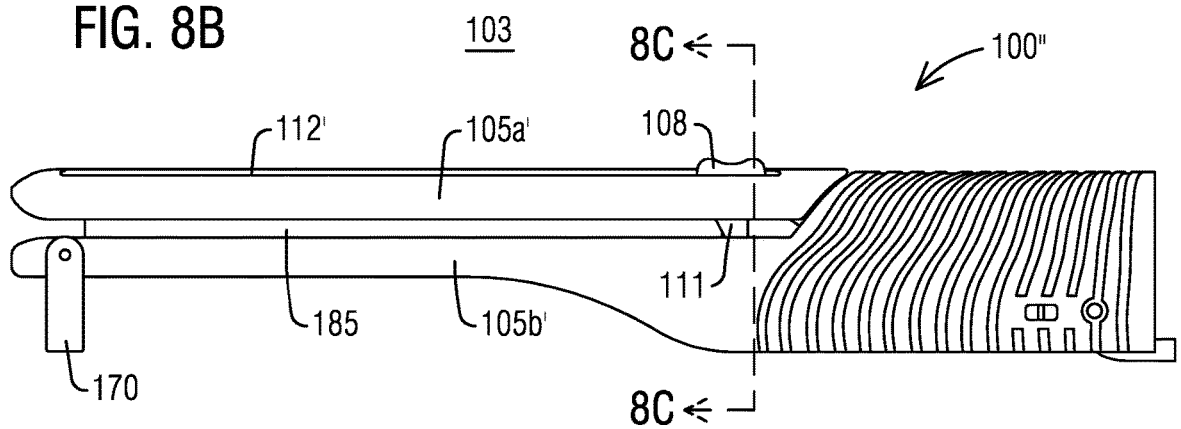
FIG. 8B is an image that illustrates an example of a side view of the system of FIG. 8A in a closed position, according to an embodiment.
Figure 8D:
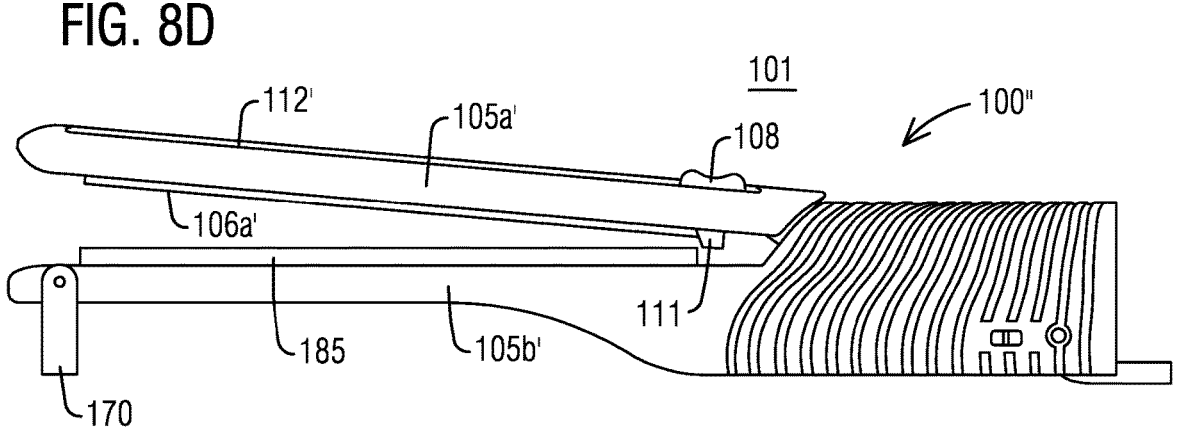
FIG. 8D is an image that illustrates an example of a side view of the system of FIG. 8A in an open position, according to an embodiment.
Figure 8C:
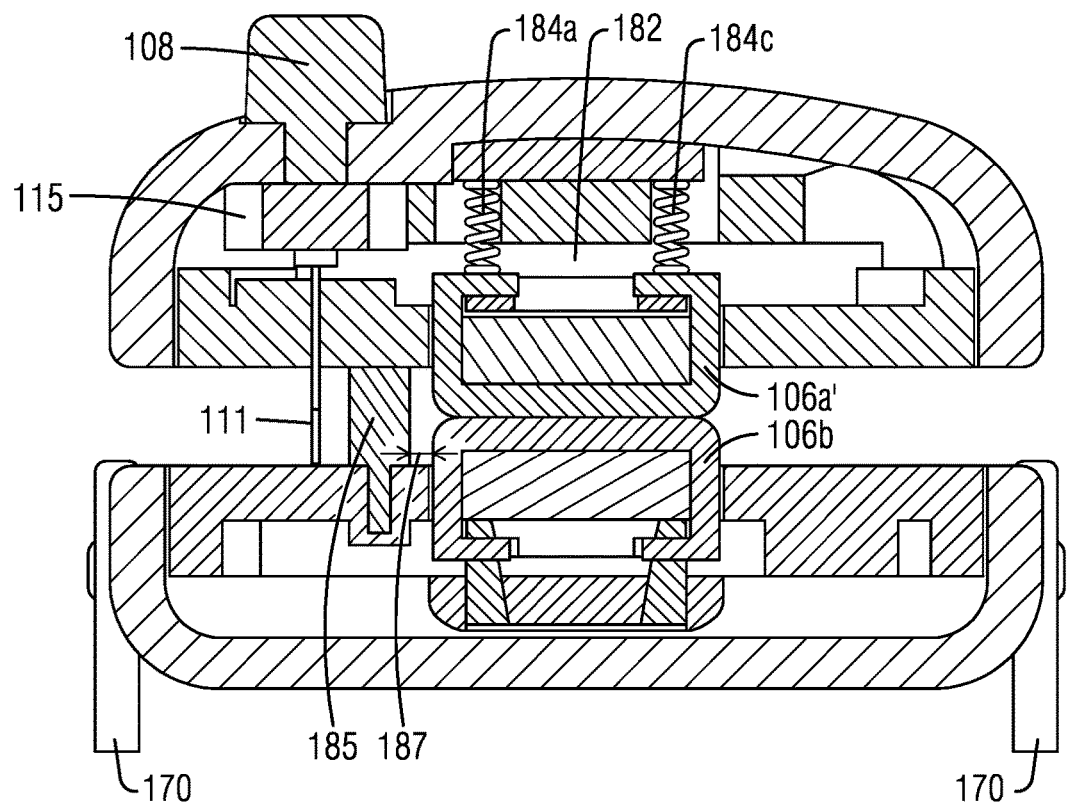
FIG. 8C is an image that illustrates an example of a cross sectional view taken along the line 8C-8C in FIG. 8B, according to an embodiment.
Figure 8E:
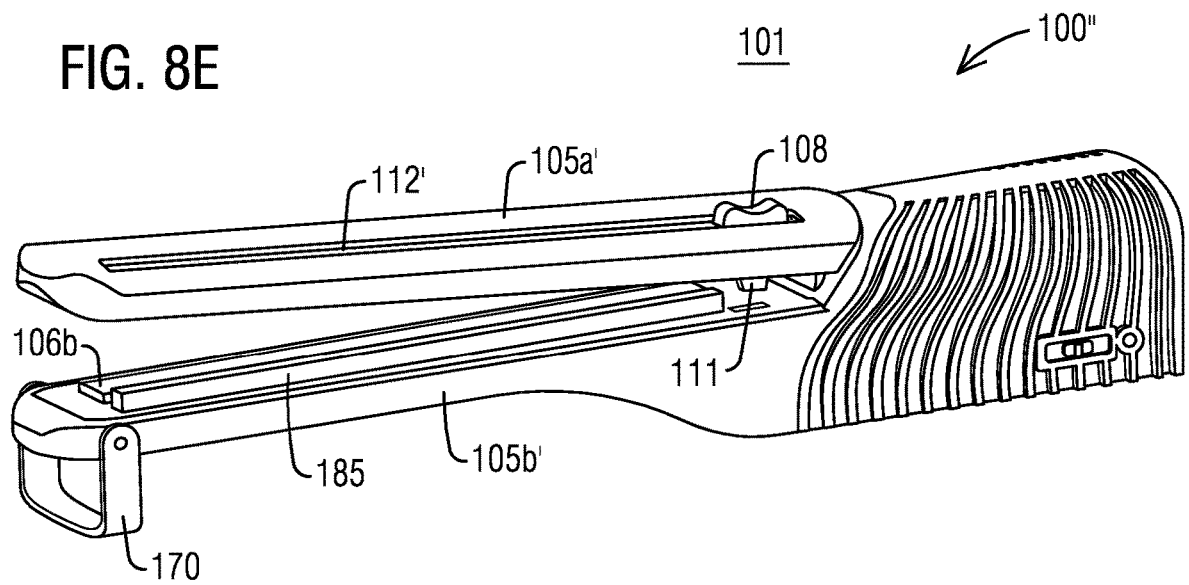
FIG. 8E is an image that illustrates an example of a perspective view of the system of FIG. 8A in an open position, according to an embodiment.

FIG. 8A is an image that illustrates an example of a perspective view of the system 100" for sealing an enclosure of plastic material in the open position 101, according to an embodiment. FIG. 8B is an image that illustrates an example of a side view of the system 100" of FIG. 8A in the closed position 103, according to an embodiment. FIG. 8C is an image that illustrates an example of a cross sectional view taken along the line 8C-8C in FIG. 8B, according to an embodiment. In an embodiment, the system 100" of FIG. 8A is similar to the system 100" of FIG. 6A, with the exception of one or more features discussed herein.

In an embodiment, a silicone layer 185 (e.g. silicone rubber layer) is provided between the heating elements 106a, 106b and the cutting element 111 and within the spacing 186 between the heating elements 106a, 106b and the cutting element 111. In one embodiment, the silicone layer 185 is oriented orthogonal to the heating elements 106a, 106b such that a longer dimension of the silicone layer 185 is oriented orthogonal to a longer dimension of the heating elements 106a, 106b. The silicone layer 185 (e.g. rubber silicone) advantageously provides thermal insulation to the cut formed in the plastic material 136 by the cutting element 111 to prevent heat from the heating elements 106a, 106b from resealing the plastic material 136 along the cut. In one embodiment, the silicone layer 185 includes an extension that is fixably received in a groove along the inner surface of the element 105b'. The silicone layer 185 is affixed within the groove of the inner surface of the element 105b' using any means appreciated by one of skill in the art (e.g. adhesive). In an embodiment, a width of the heating elements 106 along the interface 110 is about ¼" or in a range from about ⅛" to about ½" or in a range from about 1/16" to about ¾". In an embodiment, a width of the silicone layer 185 along the interface 110 is about 0.04" (1 mm) or in a range from about 0.02" (0.5mm) to about 0.08" (2mm) or in a range from about 0" to about 0.2". In still other embodiments, a width of the silicone layer 185 is based on a fraction of the width of the heating element 106, where the fraction is less than 1. In an embodiment, the height of the silicone layer 185 is sized to adjust a spacing of the inner surfaces of the elements 105a', 105b' in the closed position 103. In an embodiment, the silicone layer 185 has a minimum spacing 187 from the heating element 106b in the element 105b. In an example embodiment, the minimum spacing 187 is about 1 mm or in a range from about 0.5 mm to about 2mm. In other embodiments, the silicone layer 185 and/or the springs 184 are absent from the system 100".

In an embodiment, a pair of springs 184a, 184c are aligned with opposing sides of the heating element 106a' adjacent the first end 177a and are operatively coupled to the heating element 106a' to accommodate the heating element 106a' moving into the recess 182 in the direction orthogonal to the longitudinal axis 135a upon engagement between the heating element 106a' and heating element 106b in the closed position 103. Additionally, a pair of springs 184b are aligned with opposing sides of the heating element 106a' adjacent the second end 177b or at increment spacings between the first end 177a and second end 177b. In an embodiment, the button 108 is operatively connected to the cutting element 111 through a member 115 that is slidably received within the slot 112'. In one embodiment, the member 115 is oriented orthogonal to the cutting element 111.

In an embodiment, the system 100" includes a spring 183 that is used to spring load the element 105a' at a hinge 103' (FIG. 8G). In one embodiment, when the system 100" is in the closed position 103 and the U-shaped member 170 is rotated from the first position (FIG. 8G) to the second position (FIG. 5D), the spring 183 presses upward on the element 105a' and causes the element 105a' to rotate about the hinge 103' until the system 100" reaches the open position 101. This advantageously causes the system 100" to automatically open to the open position 101 without any effort by the user. In other embodiments, the spring 183 is omitted and the user manually rotates the element 105a' from the closed position 103 to the open position 101.

Figure 5H:
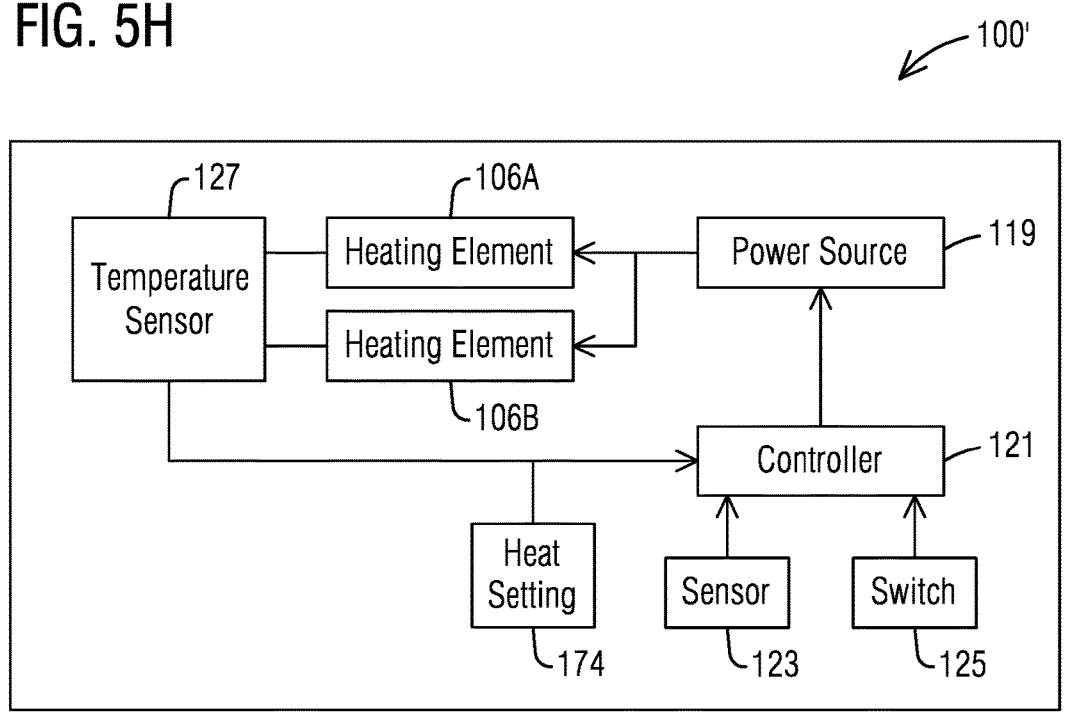
FIG. 5H is a block diagram that illustrates an example of electrical connections between the heating elements and the power source within the system of FIG. 5A, according to an embodiment.

As previously discussed, the system 100' includes one or more heat settings 174 to adjust a desired temperature of the heating elements 106a, 106b. FIG. 5H is a block diagram that illustrates an example of electrical connections between the heating elements 106a, 106b and a power source 119 (e.g. battery 118) within the system 100' of FIG. 5A, according to an embodiment. In some embodiments, the power source 119 is an electrical outlet that is connected to the system 100' through one or more electrical inlet 176 (e.g. USB port). In an embodiment, the system 100' includes a switch 125 to turn the system on or off (e.g. power switch). In one embodiment, no switch 125 is provided and the electrical connection between the power source 119 and the system (e.g. plugging the system into an electrical outlet) serves as the switch 125 that turns the system on or off. Additionally, in an embodiment, a sensor 123 is provided that detects when the elements 105a, 105b move from the open position 101 to the closed position 103 (e.g. sensor that detects engagement of heating elements 106a, 106b). In one embodiment, "open position" means an angle between the elements 105a, 105b greater than an angle threshold (e.g. about 5-10 degrees) such that the heating elements 106a, 106b are not activated in the open position, whereas the "closed position" means an angle between the elements 105a, 105b less than the angle threshold such that the heating elements 106a, 106b is activated. In another embodiment, the "open position" means an angle between the elements 105a, 105b beyond the angle threshold and the "closed position" means an angle between the elements 105a, 105b less than the angle threshold, where the angle between the elements 105a, 105b does not affect whether the heating elements 106a, 106b are activated.

In an embodiment, the system 100' includes a controller 121 that receives one or more inputs from the heat setting 174, the sensor 123 and/or the switch 125. Upon receiving these inputs, the controller 121 determines whether to transmit a signal to the power source 119 to transmit power to the heating elements 106a, 106b. In one embodiment, upon receiving a signal from the switch 125 that the system 100' is turned on, the controller 121 transmits the signal to the power source 119 to transmit power to the heating elements 106a, 106b. In this embodiment, the sensor 123 is not provided or used and the heating elements 106a, 106b are continuously heated as long as the switch 125 is turned on. In an example embodiment, the switch 125 is a power switch on an external surface of the system 100'. In another embodiment, upon receiving a signal from the switch 125 and the sensor 123 that the system 100' is turned on and that the elements 105a, 105b are in the closed position 103, the controller 121 transmits the signal to the power source 119 to transmit power to the heating elements 106a, 106b. Thus this embodiment requires that the switch 125 is turned on and that the elements 105a, 105b are in the closed position 103 in order for the heating elements 106a, 106b to be heated.

In an embodiment, selecting one of the heat settings 174 adjusts a temperature threshold that is stored in a memory of the controller 121. In an embodiment, a temperature sensor 127 is provided that continuously measures the temperature of the heating elements 106a, 106b as the power source 119 elevates the temperature of the heating elements 106a, 106b. The temperature sensor 127 continuously transmits data of the measured temperature to the controller 121 and the controller 121 continuously compares the received measured temperature data with the temperature threshold stored in the memory. When the measured temperature is equal to or greater than the temperature threshold, the controller 121 transmits a signal to the power source 119 to stop delivering power to the heating elements 106a, 106b. When the measured temperature falls below the temperature threshold, the controller 121 transmits the signal to the power source 119 to deliver power to the heating elements 106a, 106b.

In some embodiments, when the system 100' is moved to the closed position 103, the heating elements 106a, 106b receive electrical energy from the power source 119 and heat up to a desired temperature (e.g. temperature threshold based on the selected heat setting 174). In other embodiments, the heating elements 106a, 106b heat up to the desired temperature based on activating one or more controls, regardless of whether the system is in the open position 101 or closed position 103. In one embodiment, the system 100' features one or more controls (e.g. heat setting 174) to vary the desired temperature. In an example embodiment, the control features a dial to vary the desired temperature to one of a plurality of settings. In an example embodiment, the dial features between two and eight settings to vary the desired temperature to one of between two and eight different settings. In one embodiment, the desired temperature setting is adjusted based on the type of plastic material 136. In an example embodiment, enclosures made of mylar plastic material have a different desired temperature setting than enclosures made of polybag plastic material. In some embodiments, the desired temperature is selected based on a melting point of the plastic material. In an example embodiment, the system 100' features one or more controls on a surface of the elements 105a, 105b to select the desired temperature. In other embodiments, the system 100' features one or more controls to activate the heating elements 106a, 106b in the closed position 101 such that the heating elements 106a, 106b will only heat up in the closed position 101 if the control is activated. In still other embodiments, the controls activate the heating elements 106a, 106b regardless of the position of the system 100'. The temperature of the heating element 106 of the system 100 is controlled in a similar manner as the heating elements 106a, 106b of the system 100' discussed herein. In some embodiments, the first element 102a features a light emitting diode (LED) 120 (FIG. 1D) that activates in a first mode (e.g. flashing mode or a first color) when the heating element 106 is heating to the desired temperature and activates in a second mode different than the first mode (e.g. static mode or a second color) when the heating element 106 reaches the desired temperature.

Figure 3A:
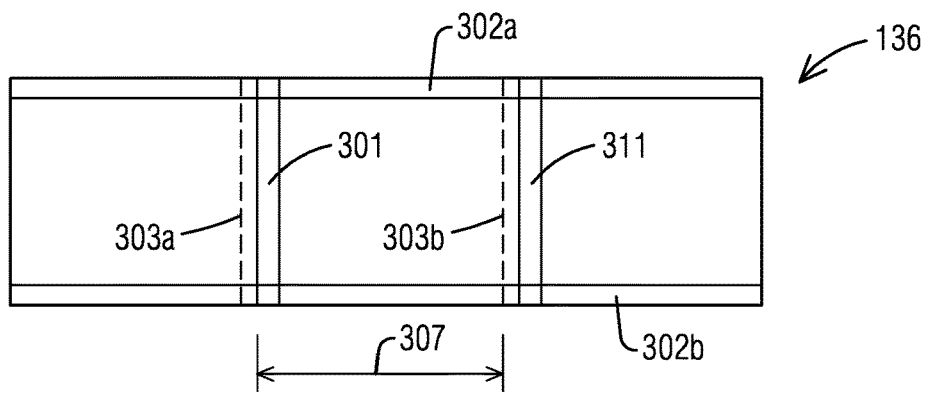
FIG. 3A is a block diagram that illustrates an example of a perspective view of a seal formed in the plastic material by the system of FIG. 5A, according to an embodiment.

The heating elements 106a, 106b heat up to the desired temperature to melt the plastic material including the first plastic layer and the second plastic layer and form a seal between the first plastic layer and the second plastic layer in the plastic material. FIG. 3A is a block diagram that illustrates an example of a perspective view of a first seal 301 formed in the plastic material 136 by the system 100', according to an embodiment. In some embodiments, the plastic material 136 includes side seals 302a, 302b before the plastic material 136 is heated with the heating elements 106a, 106b to form the first seal 301. In other embodiments, the plastic material 136 includes a first and second plastic layer that does not include the side seals 302a, 302b and the side seals 302a, 302b are formed with the heating elements 106a, 106b. In some embodiments, the plastic material 136 is exposed to the heating elements 106a, 106b at the desired temperature for a minimum time period (e.g. from about 3 seconds to about 5 seconds) to form the seal. In some embodiments, the minimum time period depends on one or more parameters of the plastic material 136 (e.g. thickness). In some embodiments, after forming the first seal 301 across the heating elements 106a, 106b, the button 108 is slid along the slot 112' of the element 105a to slide the cutting element 111 along a cut line 303a at the interface to cut the plastic material 136 adjacent to the first seal 301. A third seal 311 is then formed in the plastic material 136 using the heating elements 106a, 106b in a similar manner as to form the first seal 301 and the button 108 is slid along the slot 112' to slide the cutting element 111 along a cut line 303b to form an opening 305 in a plastic enclosure 310 (e.g. bag). The third seal 311 is formed as part of a second enclosure (e.g. second bag) that is separate and apart from the plastic enclosure 310.

Figure 3B:
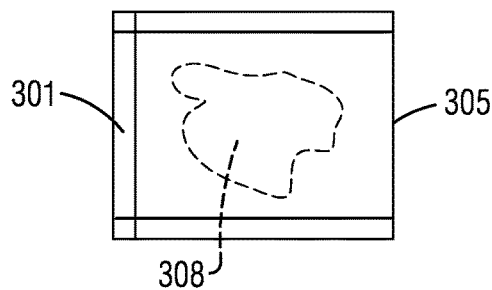
FIG. 3B is a block diagram that illustrates an example of a perspective view of the seal of FIG. 3A, according to an embodiment.
Figure 3C:
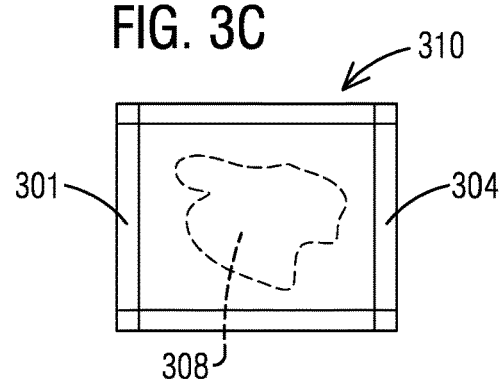
FIG. 3C is a block diagram that illustrates an example of a perspective view of a second seal formed in the plastic material by the system of FIG. 5A, according to an embodiment.

FIG. 3B is a block diagram that illustrates an example of a perspective view of the first seal 301 of FIG. 3A after cutting off the plastic material 136 from the first seal 301 using the system of FIG. 5A, according to an embodiment. The first seal 301 forms a base of the enclosure 310. An opening 305 of the enclosure 310 is provided by sliding the cutter element 111 along the cut line 303b. As discussed in the method below, contents 308 (e.g. condiments, snacks, personal products) are inserted into the enclosure 310 of plastic material 136 through the opening 305. FIG. 3C is a block diagram that illustrates an example of a perspective view of a second seal 304 formed in the plastic material 136 by the system 100' of FIG. 5A, according to an embodiment.

After inserting contents 308 through the opening 305, the opening 305 is positioned at the interface between the elements 105a, 105b and the second seal 304 is formed by the heating elements 106a, 106b between the first and second plastic layers. The enclosure, i.e. a bag 310 is then provided which includes an enclosed volume that holds the contents 308 where the enclosed volume is defined by first seal 301, second seal 304 and side seals 302a, 302b.

FIG. 3B is a block diagram that illustrates an example of a perspective view of the first seal 301 of FIG. 3A after cutting off the plastic material 136 from the first seal 301 using the system of FIG. 5A, according to an embodiment. The first seal 301 forms a base of the enclosure 310. An opening 305 of the enclosure 310 is provided by sliding the cutter element 111 along the cut line 303b. As discussed in the method below, contents 308 (e.g. condiments, snacks, personal products) are inserted into the enclosure 310 of plastic material 136 through the opening 305. FIG. 3C is a block diagram that illustrates an example of a perspective view of a second seal 304 formed in the plastic material 136 by the system 100' of FIG. 5A, according to an embodiment. After inserting contents 308 through the opening 305, the opening 305 is positioned at the interface between the elements 105a, 105b and the second seal 304 is formed by the heating elements 106a, 106b between the first and second plastic layers. The enclosure, i.e. a bag 310 is then provided which includes an enclosed volume that holds the contents 308 where the enclosed volume is defined by first seal 301, second seal 304 and side seals 302a, 302b.

FIG. 3G is a block diagram that illustrates an example of a top view of the enclosure 310' of the plastic material including interior seals 309a, 309b between the first seal 301 and the second seal 304, according to an embodiment. In this embodiment, after forming the first seal 301 and the opening 305, contents 308a are inserted through the opening 305 and an interior seal 309a is formed to keep contents 308a within a sub-enclosure of the enclosure 310'. Similarly, contents 308b are inserted through the opening 305 and an interior seal 309b is formed to keep contents 308b within a sub-enclosure of the enclosure 310'. The cutting element 111 is not slid across the interface adjacent to the interior seals 309a, 309b since it is not desired to cut the plastic material 136 adjacent to the interior seals 309a, 309b. Contents 308c are inserted through the opening 305 after which the second seal 304 is formed along the opening 305 using the elements 105a, 105b. This arrangement advantageously permits multiple sub-enclosures of contents 308 within one larger enclosure 310'. When a user wants to access contents 308c (but not contents 308a or 308b), the user can either cut the sub-enclosure with contents 308c or cut the interior seal 309b and carry the sub-enclosure with the contents 308c until they want to access the contents 308c. In an example embodiment, the user can form multiple sub-enclosures with contents 308 in each sub-enclosure for each day of the week so they only need to access the sub-enclosure for that specific day of the week.

Figure 2F:
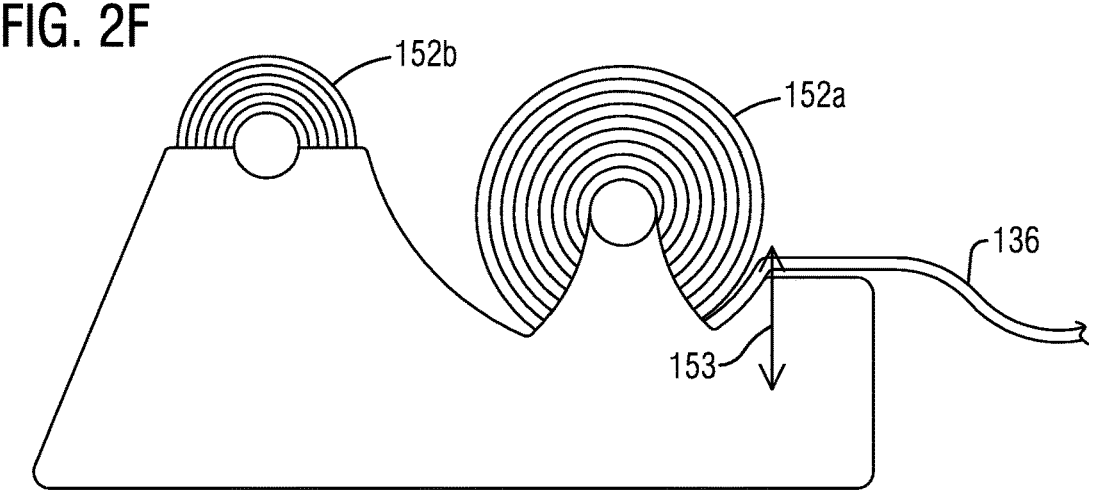
FIG. 2F is an image that illustrates an example of a side view of a plurality of reels of plastic material used in the system of FIG. 2E, according to an embodiment.
Figure 2G:
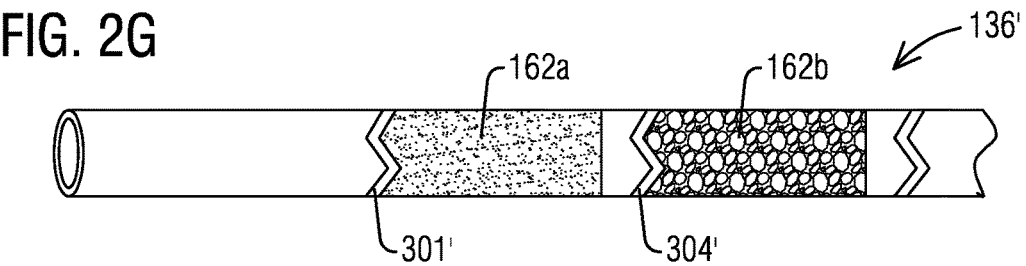
FIG. 2G is an image that illustrates an example of a top view of straw material and a plurality of capsules formed in the straw material with the system of FIG. 2E, according to an embodiment.
Figure 2H:
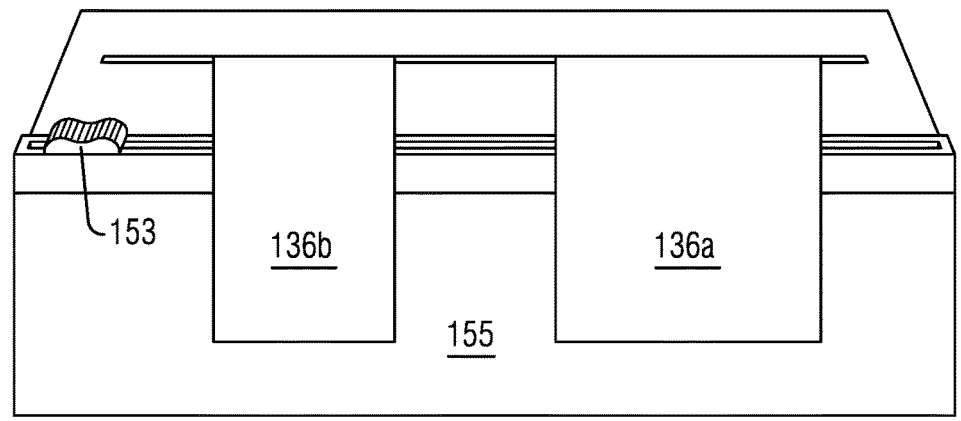
FIG. 2H is an image that illustrates an example of a perspective view of a plurality of reels of plastic material used in the system of FIG. 2E, according to an embodiment.

FIG. 4 is a flow chart that illustrates an example of a method 200 for sealing an enclosure 310 of plastic material 136, according to an embodiment. In an embodiment, the system 100, 100', 100" is portable such that one or more steps of the method 200 can be performed while the system 100, 100', 100" is held in one or both hands of a user. The method 200 below can be performed using any embodiment of the systems 100, 100', 100" previously discussed. In step 201, the plastic material 136 is positioned at the interface between the elements 105a, 105b. FIG. 2F is a block diagram that illustrates an example of a side view of a plurality of reels 152a, 152b of plastic material 136 used in the system 100' of FIG. 5A, according to an embodiment. Alternatively, a reel 152 is provided in a box 155 (FIG. 7A) and is fed out of an opening in the box 155. In an embodiment, the reels 152a, 152b hold plastic material 136 of different widths. In an example embodiment, the reel 152a holds plastic material 136a of a first width (e.g. 6 inches) and the reel 152b holds plastic material 136b of a second width that is less than the first width (e.g. 3 inches). FIG. 2H depicts an embodiment where the plastic material 136a and the plastic material 136b are fed from a box or housing that holds the reels 152a, 152b. In an example embodiment, the plastic material 136 includes side seals 302a, 302b as depicted in FIG. 3A. In one embodiment, in step 201, plastic material 136 from one of the reels 152a, 152b or reel 152 in box 155 is fed to the interface between the elements 105a, 105b. In step 201, the reel 152a, 152b is selected such that the width of the plastic material 136 is equal to or less than a length 143 of the heating element 106 (FIG. 2E). In some embodiments, a cutter 153 is provided at the reels 152a, 152b and is used to cut the plastic material 136 such that a length of plastic material 136 is provided that corresponds to a desired length of the enclosure 310. In this embodiment, step 206 can be omitted in the method 200.

Figure 3D:
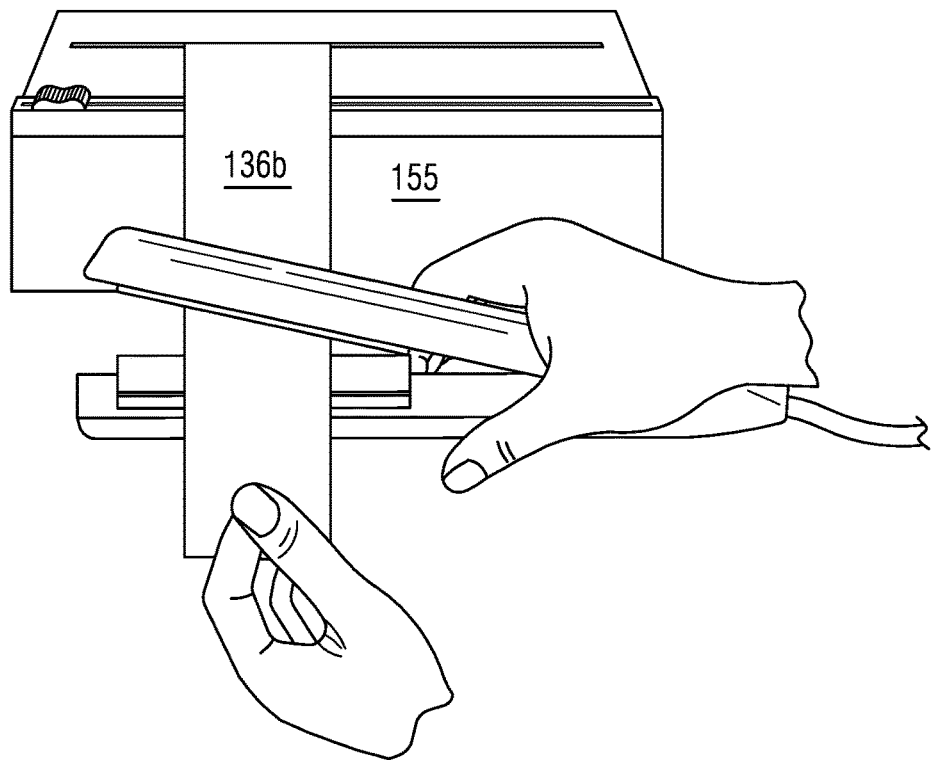
FIG. 3D is an image that illustrates an example of a perspective view of using the system to form the second seal of FIG. 3C in the plastic material, according to an embodiment.
Figure 3E:
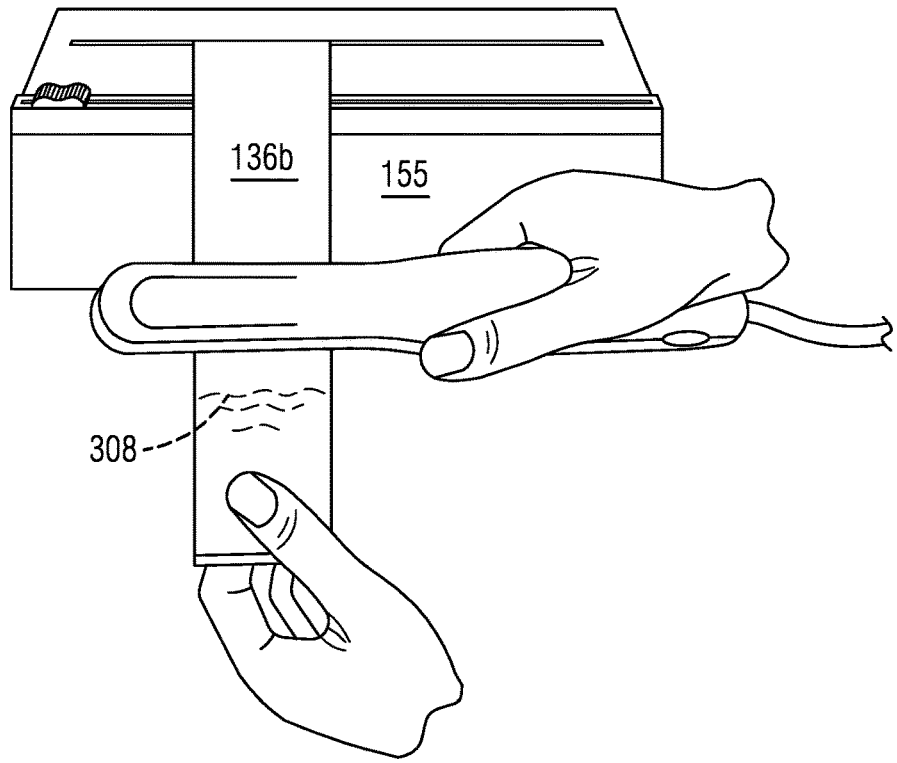
FIG. 3E is an image that illustrates an example of a perspective view of using the system to form the second seal of FIG. 3C, according to an embodiment.

In some embodiments, in step 201, the plastic material 136 is positioned at the interface of the second elements 105a, 105b so that at least a desired length 307 (FIG. 3A) of plastic material 136 is pulled from the reel 152. FIG. 3D depicts one embodiment of step 201, where the plastic material 136b is positioned at the interface of the second elements 104a, 104b of the system 100. The desired length 307 corresponds to a desired length of the enclosure 310 (e.g. bag). In an example embodiment, the desired length of the enclosure 310 is in a range from about 5 inches to about 12 inches.

Figure 7A:
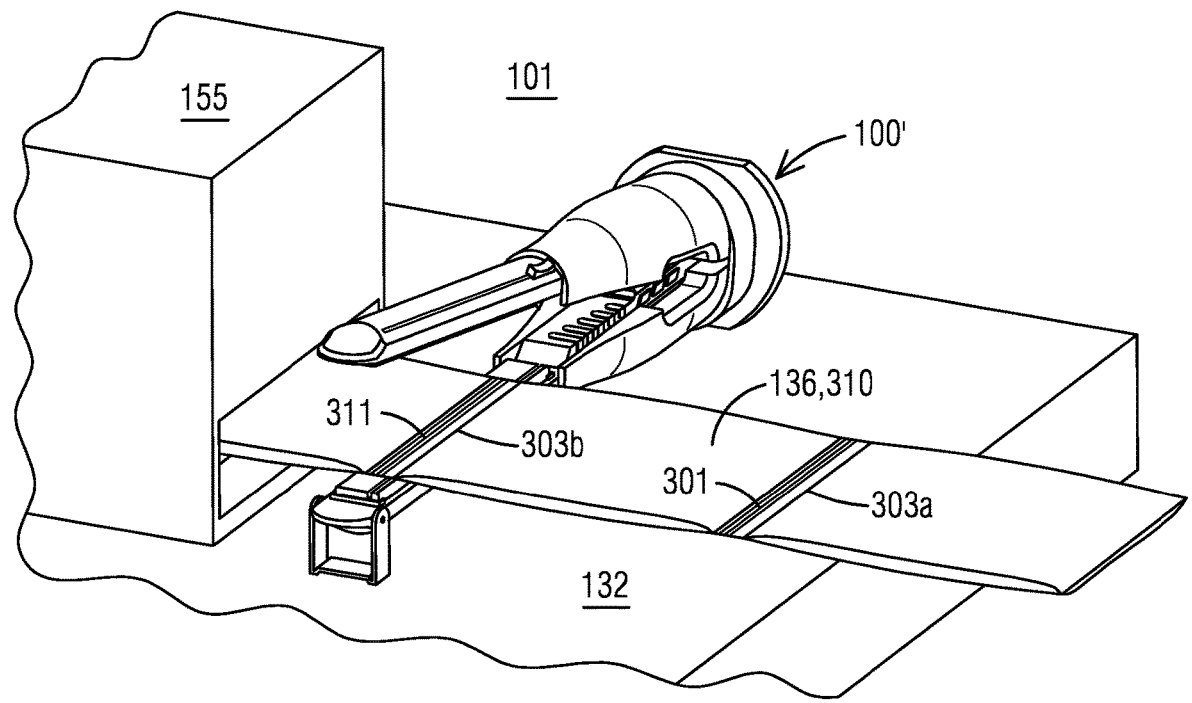
FIGS. 7A and 7B are images that illustrate an example of a perspective view of using the system of FIG. 5A to form a seal in the plastic material, according to an embodiment.

In some embodiments, in step 201, the plastic material 136 is initially moved between the elements 105a, 105b as depicted in FIG. 7A. In an example embodiment, in step 201 the plastic material 136 is moved between the elements 105a, 105b in FIG. 7A so that the region corresponding to the first seal 301 is initially positioned between the elements 105a, 105b.

Figure 7B:
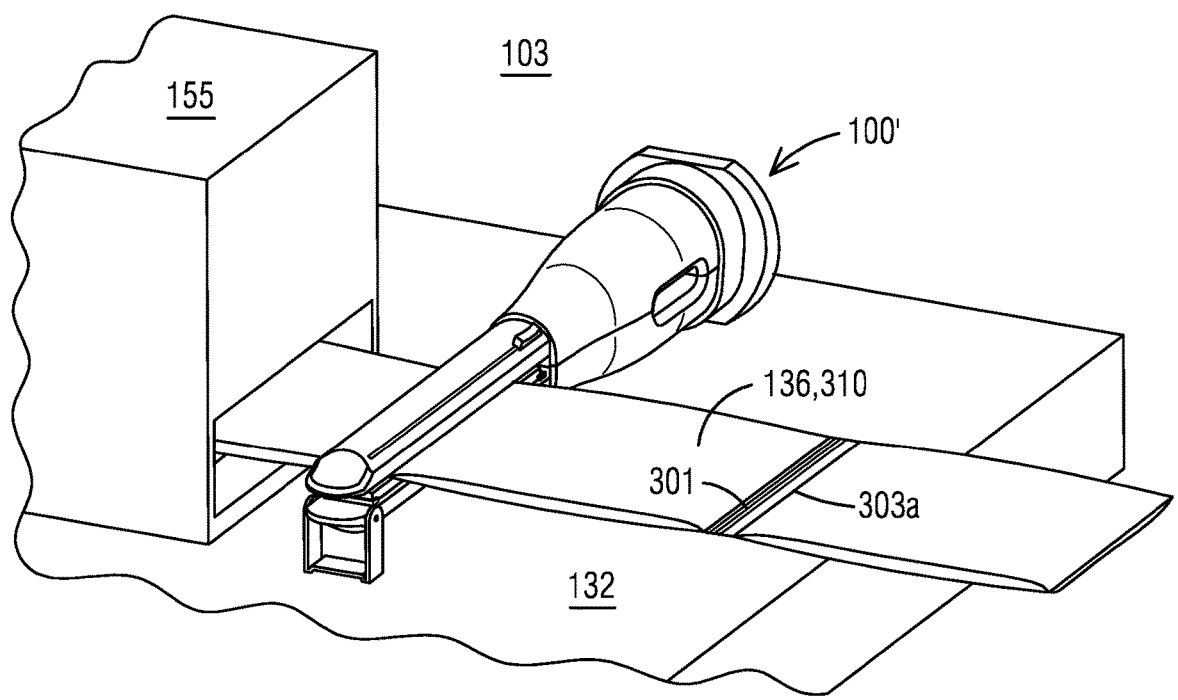
Figure 7C:
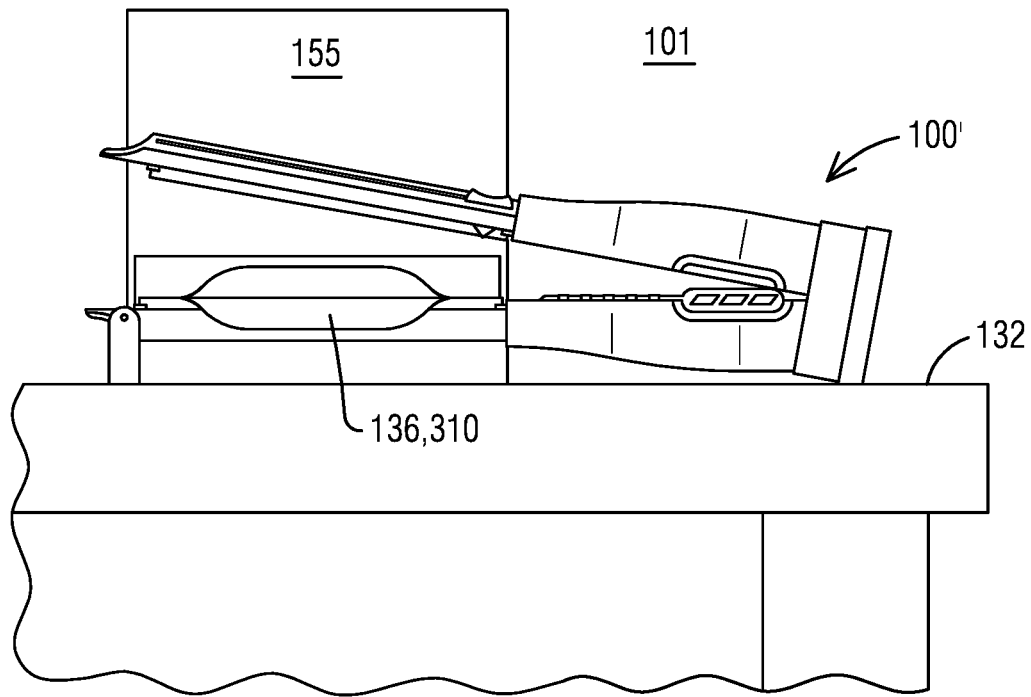
FIGS. 7C and 7D are images that illustrate an example of a side view of using the system of FIG. 5A to form a seal in the plastic material, according to an embodiment.
Figure 7D:
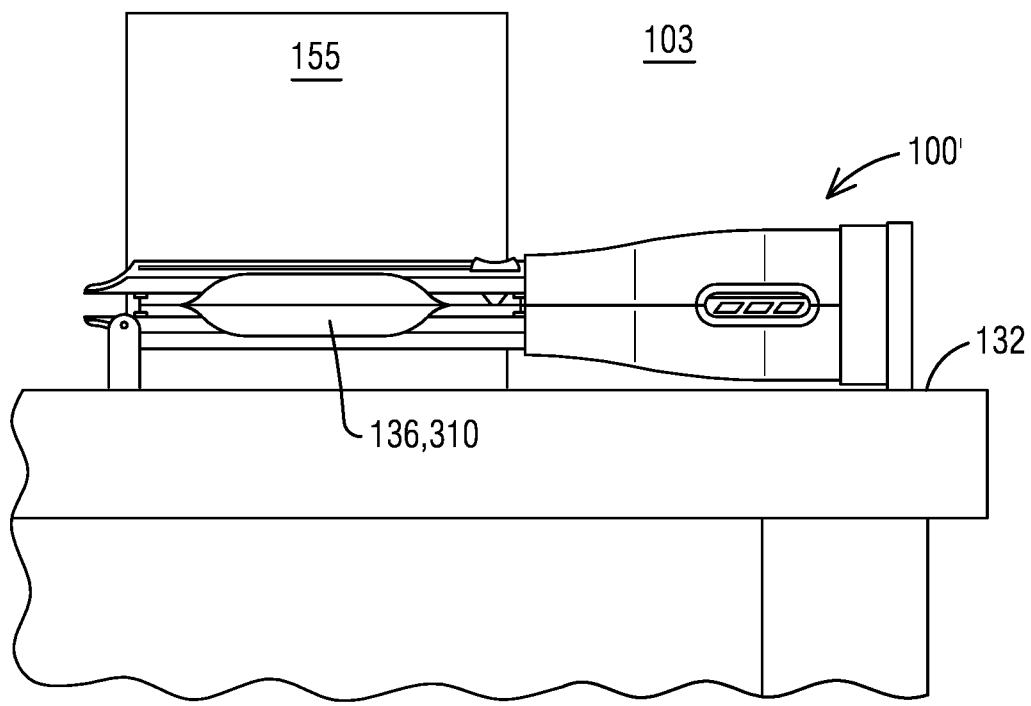

In step 202, after the plastic material 136 is positioned at the interface between the elements 105a, 105b, the heating elements 106a, 106b are pivoted from the open position 101 (FIG. 7A) to the closed position 103 (FIG. 7B). In some embodiments, in step 202, in addition to pivoting the elements 105a, 105b to the closed position 103, one or more controls are activated. The heating elements 106a, 106b then heat up to a desired temperature and increase the temperature at the interface of the heating elements 106a, 106b based on the electrical connection with the power source. In an embodiment, the desired temperature exceeds a melting temperature of the plastic material 136.

Additionally, in step 202, a first seal 301 is formed (FIG. 7A) in the plastic material 136 based on the heating of the interface in step 202. In some embodiments, in step 202, the first seal 301 is formed based on the temperature at the interface reaching the desired temperature for a minimum time period. In an example embodiment, the desired temperature is in a range from about 125 degrees to about 260 degrees. In another example embodiment, the minimum time period is in a range from about 3 seconds to about 5 seconds. In some embodiments, the user manually verifies when the minimum time period has elapsed and opens the elements 105a, 105b after that time period. In other embodiments, the heating elements 106a, 106b automatically heat up to the desired temperature and remains at that temperature for the minimum time period before automatically reducing its temperature.

In one embodiment, in step 202, after the first seal 301 is formed in the plastic material 136, the cutting element 111 is slid across the interface between the elements 105a, 105b along the cut line 303a (FIG. 3A) to cut the plastic material 136 adjacent to the first seal 301. FIG. 3B depicts one embodiment of the first seal 301 after performing step 206, where plastic material 136 adjacent to the first seal 301 has been cut off across the cut line 303a. FIG. 7A similarly depicts the cut line 303a where the cutting element 111 is slid across to cut the plastic material 136 adjacent to the first seal 301. In an embodiment, since the cutting element 111 is laterally displaced from the heating elements 106a, 106b the cut along the plastic material 136 in step 202 is advantageously displaced from the heating elements 106a, 106b which minimizes a risk that heat from the heating elements 106a, 106b melt the plastic material 136 together along the cut line 303a. Additionally, in another embodiment, the silicone layer 185 (FIG. 8C) provides thermal insulation to the plastic material 136 during the cutting along the line 303a, to reduce the risk of heating and resealing of the plastic material 136 along line 303a after cutting.

In step 204, a third seal 311 is formed between the first and second layers of the plastic material 136 based on pivoting the elements 105a, 105b from the open position 101 to the closed position 103, in the same manner that the first seal 301 was formed in step 202. FIG. 7A depict the plastic material 136 positioned between the elements 105a, 105b before the elements 105a, 105b are moved to the closed position 103 (FIG. 7B) to form the third seal 311. FIG. 3A depicts the third seal 311 formed in the plastic material 136.

In step 206, the cutting element 111 is moved at the interface 110 between the elements 105a, 105b along the cut line 303b to form the opening 305 in the enclosure 310. After step 206, the enclosure 310 as depicted in FIG. 3B is obtained including the first seal 310 and the opening 305 with the side seals 302a, 302b. In an embodiment, since the third seal 311 is detached from the enclosure 310 in step 206, the third seal 311 is used to form a second enclosure after the enclosure 310. In an example embodiment, the third seal 311 forms a similar seal in the second enclosure as the seal 301 in the enclosure 310.

FIG. 3B is a block diagram that illustrates an example of a perspective view of the plastic material 136 after using the cutting element 111 in step 206 to cut the plastic material 136 along the cut line 303b adjacent to the seal 311. An opening 305 (between the first and second plastic layers) is provided in the plastic material 136 opposite from the first seal 301.

In step 208, contents 308 (e.g. condiments, snacks, personal products) are inserted through the opening 305 of the plastic material 136. In one embodiment, a desired amount of contents 308 are inserted into the opening 305. In some embodiments, the contents 308 are liquid contents. In other embodiments, the contents 308 are solid contents.

In step 210, the opening 305 of the plastic material 136 is positioned at the interface between the elements 105a, 105b, after performing step 208. FIG. 3F depicts one embodiment of step 210, where the opening 305 of the plastic material 136 is positioned at the interface between the elements 105a, 105b. In some embodiments, step 210 is similar to step 201 with the exception that the opening 305 is positioned at the interface of the elements 105a, 105b. Step 212 is then performed which is similar to step 202.

Figure 7E:
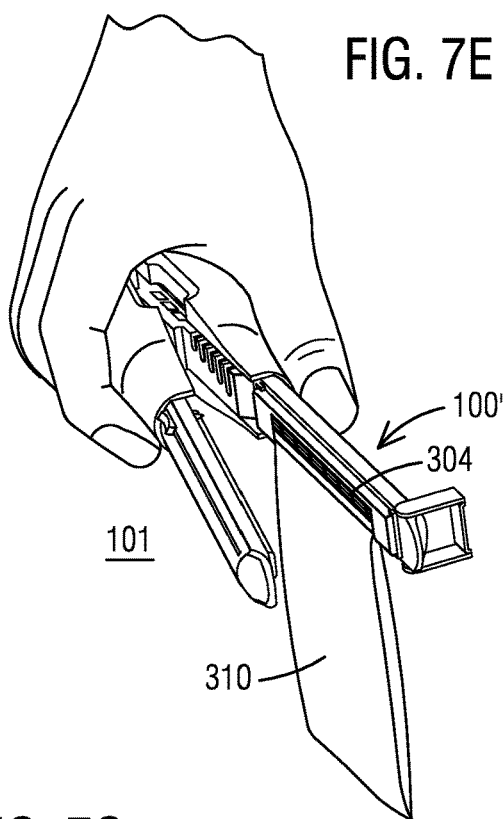
FIGS. 7E and 7F are images that illustrate an example of a perspective view of using the system of FIG. 5A to form a second seal in the plastic material, according to an embodiment.
Figure 7F:
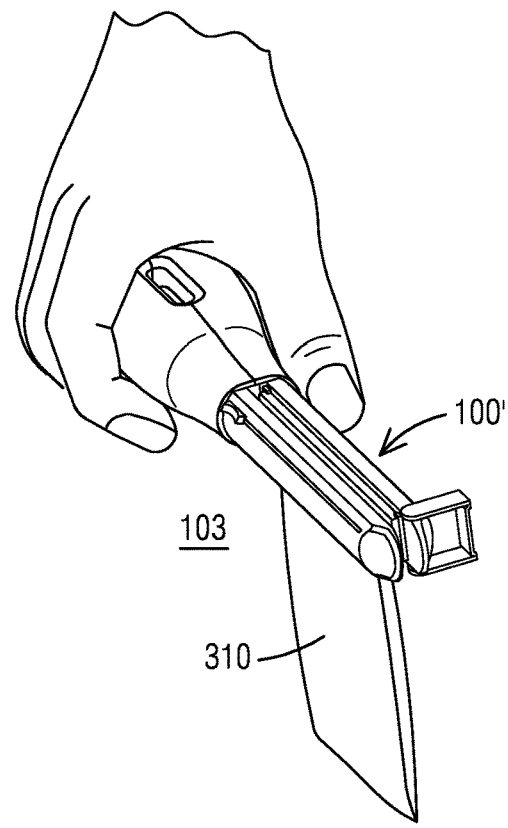

In step 212, a second seal 304 is formed in the plastic material 136 based on the heating of the interface in step 212. Upon performing step 212, the enclosure 310 (e.g. bag) is formed between the first seal 301, second seal 304 and side seals 302a, 302b. FIG. 3F depicts one embodiment of the enclosure 310 including the first seal 301 and second seal 304. In other embodiments, enclosures are formed other than rectangular enclosures, including arcuate shaped enclosures or enclosures based on any polygon shape. FIGS. 7E and 7F depict the system 100' being held in a hand of a user and used to form the second seal 304 as the user moves the system 100' from the open position 101 (FIG. 7E) to the closed position 103 (FIG. 7F).

Figure 7G:
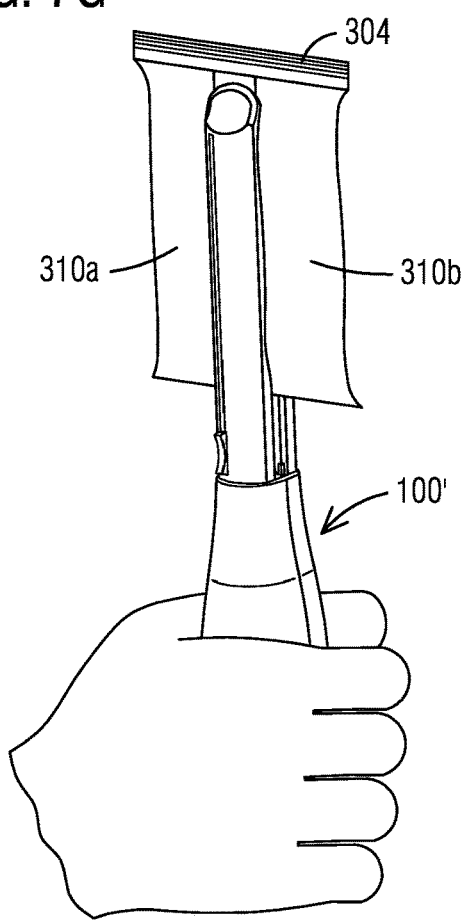
FIG. 7G is an image that illustrates an example of a perspective view of using the system of FIG. 5A to form interior seals in the plastic material, according to an embodiment.

In some embodiments, the method 200 is performed to fill the enclosure 310' (e.g. bag) with contents 308a, 308b, 308c (FIG. 3G) in respective sub-enclosures within the enclosure 310' and interior seals 309a, 309b are formed between the first seal 301 and the second seal 304. In these embodiments, steps 208 and 212 (omitting step 210) are repeatedly performed where step 212 involves forming the interior seal 309, until the desired number of sub-enclosures within the enclosure 310' are filled with contents 308a, 308b, 308c. Although FIG. 3G depicts three sub-enclosures within the enclosure 310', more than three or less than three sub-enclosures can be formed. After the desired number of sub-enclosures are formed (e.g. steps 208 and 212 are repeated a desired number of times), then step 212 is performed to close the opening 305 of the enclosure 310' with the second seal 304. Additionally, although FIG. 3G depicts that the sub-enclosures and interior seals 309 are formed in one direction and parallel to the first and second seals 301, 304, the interior seals can be omnidirectional such as vertical interior seals that are orthogonal to the first and second seals 301, 304 (FIG. 7G) that forms vertical sub-enclosures 310a, 310b or diagonal interior seals to form diagonal sub-enclosures within the enclosure 310'.

In some embodiments, the method 200 is performed using a straw 136' (FIG. 2G) where the first seal 301' and second seal 304' are formed in the straw 136' to form an enclosure (e.g. capsule 162) with the straw 136' material. In an example embodiment, the capsule 162 is filled with contents (e.g. spices) between forming the first seal 301' and second seal 304'. In one embodiment, in the method 200 using the straw 136', a first heating element 106 with a first length 143 based on a width of the plastic material 136 is replaced a second heating element 106 with a second length 143 e.g. based on a width of the straw 136'.

Although steps are depicted in FIG. 4 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

Table 1 below lists various parameters (e.g. size, types of contents 308, etc) of various portions of the system 100, 100' and seal formed with the system 100, 100', 100" as well as different types of plastic material 136 that are used with various designs of the system 100, 100', 100" and different types of contents 308 associated with each type of plastic material 136. The parameters in Table 1 are merely one example embodiment of parameters that are used with the system 100, 100', 100" and are non-limiting. In other embodiments, parameters other than those listed in Table 1 can be used to form the system 100', 100', 100" or seal formed with the system 100, 100', 100".

TABLE 1

| Description | Travel Size | Standard Size | Uses | Bag Width | Bag Thickness |
|---|---|---|---|---|---|
| Size | | | | | |
| Heating element length | 2.5 inches | 5.5 inches | | | |
| Including slide cutter | 3.0 inches | 6.0 inches | | | |
| Handle length | 4.0 inches | 4.5 inches | | | |
| Total length | 7.0 inches | 10.5 inches | | | |
| Seal width | 0.25 inches on each side | 0.25 inches on each side | | | |
| Heating time | | | | | |
| Power | | | | | |
| Cordless-Battery type | Yes | Rechargeable | | | |
| Wired-Plug in power | Will work while charging | Yes | | | |
| Heat Settings | 2 | 3 | | | |
| Bags | | | | | |
| Medical Grade | N/A | Pills, liquids | Prescription | 2" | 8 ml |
| Thick bags-polyethylene with nylon | N/A | Liquids (food for boiling & microwaving) | Food | 2", 4", 6" | 7 ml |
| Thin bags | Liquids-thin bags | Liquids-thin bags | Household | 2", 4", 6" | 2 ml |
| Thinnest bags | Small items-thinnest bag | Small items-thinnest bag | Crafts | 2", 4", 6" | 1.2 ml |
| Total bags | 6 | 10 | | | |

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

What is claimed is:

1. An apparatus for sealing an enclosure of plastic material comprising:
   a handle including a pair of elements pivotally coupled together at a first end of the elements, and wherein a first longitudinal axis of the elements intersects the handle; and
   a heating element positioned along an inner surface of at least one element and connected to a power source, wherein a second longitudinal axis of the heating element is oriented parallel to the first longitudinal axis of the at least one element; and
   a cutting element positioned at an inner surface of a first element of the pair of elements and offset from a center of a width of the first element by a minimum spacing such that a cut formed in the plastic material by the cutting element is not resealed by heat from the heating element, wherein the cutting element is configured to move relative to the inner surface of the first element to cut the plastic material;
   wherein upon positioning plastic material including a first plastic layer and a second plastic layer at an interface between the pair of elements and upon pivoting of the pair of elements from an open position to a closed position the heating element is configured to increase a temperature at the interface to melt the plastic material and form a first seal between the first plastic layer and the second plastic layer.

2. The apparatus of claim 1, wherein said cutting element is slidably received in a first slot of the first element so that the cutting element is configured to slide along the inner surface of the first element and wherein an inner surface of a second element of the pair of elements includes a second slot to slidably receive the cutting element along the interface when the plastic material is cut by the cutting element.

3. The apparatus of claim 2, wherein the second slot and the heating element are positioned along the inner surface of the second element such that the second slot is spaced apart from the heating element by a minimum spacing.

4. The apparatus of claim 2, wherein a length of the second slot is greater than or equal to a length of the heating element along the inner surface of the second element.

5. The apparatus of claim 2, wherein the first element further includes a button on an outer surface of the first element, wherein the button is connected to the cutting element through the first slot such that the cutting element is configured to slide along the inner surface based on movement of the button along the outer surface.

6. The apparatus of claim 1, wherein a first heating element is movable in a direction orthogonal to the longitudinal axis of the first element based on pivoting the pair of elements to the closed position so that the first heating element is configured to retract relative to the cutting element such that the cutting element extends beyond the heating element in the direction orthogonal to the longitudinal axis of the first element.

7. The apparatus of claim 6, wherein at least one spring is positioned between the first heating element and the first element and wherein a second heating element is positioned along the inner surface of a second element of the pair of elements and wherein the first heating element is movable in the direction orthogonal to the longitudinal axis of the first element based on engagement of the first heating element and the second heating element at the interface.

8. The apparatus of claim 1, wherein multiple heating elements are provided along the inner surface of each element.

9. The apparatus of claim 1, further comprising a layer of heat insulation material positioned between the cutting element and the heating element.

10. An apparatus for sealing an enclosure of plastic material comprising:
a handle including a pair of elements pivotally coupled together at a first end of the elements, wherein a first longitudinal axis of the elements intersects the handle;
a heating element positioned along an inner surface of at least one element and connected to a power source, wherein a second longitudinal axis of the heating element is oriented parallel to the first longitudinal axis;
a cutting element positioned at an inner surface of at least one element wherein the cutting element is configured to move relative to the inner surface of the at least one element to cut the plastic material along the interface adjacent a seal in the plastic material; and
a base adjacent the first end of the elements, said base comprising a first flat surface configured to engage a level surface to support the apparatus along the level surface such that the apparatus is about parallel to the level surface and said base further comprising a second flat surface configured to engage the level surface to vertically mount the apparatus along the level surface in a vertical orientation;
wherein upon positioning plastic material including a first plastic layer and a second plastic layer at the interface between the elements and upon pivoting of the elements from an open position to a closed position the heating element is configured to increase a temperature at the interface to melt the plastic material and form the seal between the first plastic layer and the second plastic layer across the interface.

11. The apparatus of claim 10, further comprising:
a U-shaped member rotatably fixed to a second end of one of the elements opposite from the first end, wherein the U-shaped member is configured to rotate from a first position to clasp the pair of elements together in the closed position to a second position to support the second end of the elements on a level surface when the apparatus is placed on the level surface;
wherein the U-shaped member and the base are configured to support the pair of elements on the level surface so that the pair of elements in the closed position are about parallel to the level surface.

12. The apparatus of claim 10, wherein the base further comprises an outer diameter that is greater than or equal to an outer diameter of the pair of elements between the first end and the second end.

13. The apparatus of claim 10, wherein the base includes a first pair of opposing sides separated by a width dimension and a second pair of opposing sides separated by a length dimension greater than the width dimension, wherein the first pair of opposing sides are the at least one first flat surface and wherein the second pair of opposing sides ends comprise arcuate sides.

14. The system of claim 10, wherein the apparatus is portable such that operation of the apparatus including the plastic material being positioned at the interface between the pair of elements, the pair of elements being pivoted from the open position to the closed position and the formation of the seal are performed while the apparatus is held in a hand of a user.

15. A method for sealing an enclosure of plastic material using the apparatus of claim 1, comprising:
positioning the plastic material including a first plastic layer and a second plastic layer at the interface between the pair of elements pivotally coupled together, wherein the heating element is positioned along the inner surface of at least one of the elements;
pivoting the pair of elements from the open position to the closed position such that the heating element increases the temperature at the interface to melt the first plastic layer and the second plastic layer; and
forming the first seal between the first plastic layer and the second plastic layer based on the melting of the first plastic layer and the second plastic layer.

16. The method of claim 15, further comprising:
filling the enclosure of the plastic material with contents through an opening in the enclosure of the plastic material;
positioning the plastic material including the first plastic layer and the second plastic layer at the interface;
pivoting the pair of elements from the open position to the closed position such that the heating element increases the temperature at the interface to melt the first plastic layer and the second plastic layer;
forming a second seal between the first plastic layer and the second plastic layer based on the melting of the first plastic layer and the second plastic layer, wherein the enclosure of plastic material is formed between the first seal and the second seal;
pivoting the pair of elements from the open position to the closed position such that the heating element increases the temperature at the interface to melt the first plastic layer and the second plastic layer;
forming a third seal between the first plastic layer and the second plastic layer, wherein the third seal is used to form a second enclosure separate from the enclosure;
moving the cutting element at the interface to cut the plastic material adjacent the third seal to form the opening in the enclosure of plastic material;
and wherein the second seal is formed to close the opening after the filling step.

17. The method of claim 16, wherein the enclosure is a bag, wherein opposite sides of the bag are sealed before performing the method, wherein a top and a bottom of the bag are sealed by the respective first seal and second seal and wherein a length of the heating element is selected based on a width of the bag between the opposite sides.

18. The method of claim 15, wherein the enclosure is a capsule, wherein the plastic material is a straw, wherein a top and a bottom of the capsule are sealed by the respective first seal and second seal and wherein a length of the heating element is selected based on a width of the straw and wherein a thickness of the heating element is selected based on a thickness of the straw so that the temperature at the interface reaches a melting point of the straw.

* * * * *